(12) United States Patent
Zhang

(10) Patent No.: US 6,842,214 B2
(45) Date of Patent: Jan. 11, 2005

(54) LIQUID CRYSTAL DISPLAY DEVICE AND METHOD OF MANUFACTURING THE SAME

(75) Inventor: Hongyong Zhang, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 82 days.

(21) Appl. No.: 10/108,743

(22) Filed: Mar. 28, 2002

(65) Prior Publication Data

US 2003/0058376 A1 Mar. 27, 2003

(30) Foreign Application Priority Data

Sep. 26, 2001 (JP) ........................................ 2001-294582

(51) Int. Cl.$^7$ ........................ G02F 1/1345; G02F 1/136
(52) U.S. Cl. ........................................ 349/152; 349/43
(58) Field of Search ........................ 349/139, 149–152, 349/42–43

(56) References Cited

U.S. PATENT DOCUMENTS 5,667,853 A * 9/1997 Fukuyoshi et al. ........ 428/1.62
6,055,034 A * 4/2000 Zhang et al. ............... 349/151
6,144,082 A   11/2000 Yamazaki et al. ........... 257/412

FOREIGN PATENT DOCUMENTS

JP        2000-36599        2/2000

* cited by examiner

*Primary Examiner*—Dung T. Nguyen
(74) *Attorney, Agent, or Firm*—Greer, Burns & Crain, LTD

(57) ABSTRACT

There are contained a peripheral circuit portion B having first metal patterns formed on a first substrate, a first insulating film formed on the first metal patterns, a second metal pattern formed on the first insulating film, a second insulating film formed on the second metal pattern to have at least a first resin film, and third metal patterns formed on the second insulating film, and a display portion A having an active element formed on the first substrate and covered with the second insulating film and a second resin film, and a pixel electrode formed in a pixel region on the second insulating film and connected electrically to the active element via a hole that is formed in the second insulating film. Accordingly, the liquid crystal display device that has the display portion A and the peripheral circuit portion B is capable of reducing the capacitance between wirings and improving the throughput.

18 Claims, 28 Drawing Sheets

FULL BUILT-IN TYPE (THE DIGITAL DRIVER BUILTED IN)

PART BUILT-IN TYPE (THE ANALOG SWITCH AND THE BLOCK CONTROL CIRCUIT BUILTED IN)

PART BUILT-IN TYPE (THE ANALOG SWITCH BUILTED IN ONLY)

LIQUID CRYSTAL DISPLAY DEVICE AND METHOD OF MANUFACTURING THE SAME

CROSS-REFERENCE TO RELATED APPLICATIONS

This application is based upon and claims priority of Japanese Patent Application No. 2001-294582, filed in Sep. 26, 2001, the contents being incorporated herein by reference.

BACKGROUND OF THE INVENTION

1. Field of the Invention

The present invention relates to a liquid crystal display device and a method of manufacturing the same and, more particularly, a liquid crystal display device in which a peripheral circuit or a signal processing circuit having CMOS field effect transistors is built and a method of manufacturing the same.

2. Description of the Prior Art

In the active-matrix type liquid crystal display device in which the peripheral circuit or the signal processing circuit is built, the thin film transistors (TFTs) are employed as the CMOS transistors of the analog switch or the inverter in not only the display region but also the peripheral circuit or the signal processing circuit.

The low-temperature polysilicon technology is applied to the thin film transistors in the peripheral circuit or the signal processing circuit like the display region.

The low-temperature crystallization technology is indispensable to the manufacture of the high performance/low cost peripheral driver circuit TFTs. The typical crystallization technology that is currently put to practical use is the low-temperature crystallization technology employing the excimer laser. This excimer laser makes it possible to form the silicon crystal thin film with good quality on the low-melting glass.

The basic crystallization method by the excimer laser is given as follows, for example.

First, the amorphous silicon (a-Si) starting thin film is formed on the glass substrate by using the thin film forming method such as PECVD (Plasma-Enhanced CVD), etc. Then, in order to improve the laser resistance of the starting thin film, the hydrogen in the a-Si starting thin film is removed by the heating process at 400 to 450° C. Then, the polysilicon thin film is formed by irradiating the laser beam of the excimer laser onto the a-Si starting thin film to crystallize it. Then, the crystallinity is improved by processing the polysilicon thin film in the atmosphere such as hydrogen, steam, etc.

By employing such polysilicon thin film, the switching TFT array is formed in the pixel display portion and also the semiconductor integrated circuit is formed in the peripheral circuit portion on the same substrate. Normally the liquid crystal display device in which the peripheral circuits are built is composed of the pixel display portion TFT array, the gate driver circuit, and the data driver circuit. In the data driver circuit, normally the high performance TFTs that have the operating frequency in the range of several megahertz (MHz) to several tens MHz, the field effect mobility of 50 to 300 $cm^2/Vs$, and the proper threshold voltage Vth are used.

However, the request for the mobility of TFT is not so severe in the gate driver circuit and the pixel display portion, and the mobility of more than 20 $cm^2/Vs$, for example, may be employed.

In contrast, as the new technical trend of the liquid crystal display device, it is intended to attain the ultra high-definition display panel and the high performance built-in type large-scale semiconductor circuit.

First, the ultra high-definition display panel will be explained hereunder.

With the progress of the multimedia technology and the mobile technology and also the spread of the Internet, it is usually needed to peruse/process a great deal of information. Therefore, the request of the ultra high-definition display function in specification for the liquid crystal display device as the man-machine interface is increased. For instance, the large-size high-definition display device of more than 200 dpi or the small-size mobile ultra high-definition liquid crystal display device are required in the application fields such as the multi-screen display, the multitasking process, the CAD design, etc.

Then, the high performance liquid crystal panel built-in large-scale semiconductor circuit will be explained hereunder.

In the low-temperature polysilicon integrated panel, there appears the technical trend that can accomplish the intelligent panel or the sheet computer by providing the high performance large-scale semiconductor integrated circuit to the peripheral circuit portion. For example, it is possible that the digital driver, the data processing circuit, the memory array, the interface circuit, and the CPU are built in the liquid crystal display panel on the data side.

The ordinary thin film transistors are employed as the active elements employed in such peripheral circuit. As set forth in Patent Application Publication (KOKAI) 2000-36599, for example, respective thin film transistors in the peripheral circuit portion and the pixel portion are formed by the same steps, and also the wirings formed on these thin film transistors are formed by the same steps.

For instance, as shown in FIG. 1, the thin film transistor 101 in the display portion A and the thin film transistor 102 in the peripheral circuit portion B are formed simultaneously on one substrate 103, and then these thin film transistors 101, 102 are covered with the first interlayer insulating film 104. The polysilicon film 100 constituting the thin film transistors 101, 102 is formed by patterning the above low-temperature polysilicon film. The gate insulating film 110 is formed between the polysilicon film 100 and the gate electrodes 101g, 102g. In this case, the gate electrodes 101g, 102g are formed at the same time as the first-layer wiring (not shown).

Then, the second-layer wiring 105, the second interlayer insulating film 106, the third-layer wiring 107, and the third interlayer insulating film 108 are formed in sequence on the first interlayer insulating film 104. The second-layer wiring 105 is connected to the thin film transistor 101 in the display portion A and the thin film transistor 102 in the peripheral circuit portion B via the holes formed in the first interlayer insulating film 104 respectively. The third-layer wiring 107 is connected to the thin film transistor 102 in the peripheral circuit portion B via the hole formed in the second interlayer insulating film 106. The metal constituting the second-layer wiring 105 is used as the black matrix BM in the display portion A. Also, the pixel electrode 109 is formed on the third interlayer insulating film 108 in the display portion A, and the pixel electrode 109 is connected to the source region of the thin film transistor 101.

In this case, in the liquid crystal display panel, the pixel pitch is reduced smaller with the progress of the high definition display, and thus the peripheral circuit density is extremely increased. For such purpose, the ultra-high definition panel having the digital driver therein and having more than 200 dpi must be formed.

For example, in the case of the 8.4 type UXGA panel, the pixel number is 1600 (horizontal direction)×3×1200 (vertical direction), the display definition is 238 dpi, and the sub pixel pitch is 35.5 μm. As other example, in the case of the 15 type QXGA panel, the pixel number is 2048 (horizontal direction)×3×1536 (vertical direction), the display definition is 171 dpi, and the sub pixel pitch is 49.5 μm.

In order to drive such pixel column of one vertical line, the peripheral circuit consisting of several hundreds to several thousands TFTs must be installed into such narrow pixel pitch region. Also, in order to manufacture the high performance low-temperature polysilicon, the intelligent panel, the sheet computer, etc., the large-scale integrated circuits such as the digital driver, the data processing circuit, the memory array, the interface circuit, the CPU, etc. must be built in the peripheral region. Thus, these large-scale integrated circuits must be installed in the narrow frame region.

In contrast, because of the requests for the lightweight and the compactness, the frame allowed for the liquid crystal panel is in the range of several mm from the edge of the glass substrate. Thus, it is impossible to expect the panel that has the frame of more than 10 mm.

In case the TFTs are arranged to satisfy the above conditions, the wiring pitch is narrowed. Therefore, there is caused such a new problem that the floating capacitance between the wirings is increased.

Also, in the multi-layered wiring structure shown in FIG. 1, the insulating film must be formed between the uppermost wiring and the pixel electrode respectively, and also the hole for connecting the uppermost wiring and the pixel electrode must be formed in the insulating film. Therefore, the pixel electrode connecting hole must be formed singularly, and thus there is the possibility that the throughput is lowered.

SUMMARY OF THE INVENTION

It is an object of the present invention to provide a liquid crystal display device capable of reducing a capacitance between the wirings and also improving the throughput, and a method of manufacturing the same.

According to the liquid crystal display device of the present invention, the resin film is formed between the first metal pattern and the second metal pattern that are formed vertically. Therefore, the floating capacitance of the multi-layered wiring structure consisting of the first metal pattern and the second metal pattern can be reduced and thus the operation frequency of the peripheral circuit portion can be improved widely. In addition, since the floating capacitance should be seldom considered, the margin of circuit design can be enhanced.

Also, according to the present invention, the uppermost wiring and the pixel electrode are formed by the same insulating film. Therefore, the pixel-electrode connecting holes in the display portion can be formed simultaneously with the wiring connecting holes in the peripheral circuit portion, and thus the throughput can be improved.

In addition, the uppermost metal pattern of the multi-layered wiring structure in the peripheral circuit portion and the pixel electrodes in the display portion are covered with the same resin film, e.g., the alignment film. Therefore, the film thickness can be formed easily thick in contrast to the case where the inorganic insulating film is formed singly on the uppermost metal pattern, and thus the manufacturing process can be simplified.

In this case, the above insulating film is also referred to as the interlayer insulating film. Also, the substrate may be formed of the TFT substrate, and the wiring may be formed of the metal wiring.

According to the present invention, the transparent conductive film constituting the pixel electrodes is formed on the wirings in the peripheral circuit portion. Therefore, the wirings can be protected from the external environment before the resin film is formed on the wirings and the pixel electrodes.

According to the present invention, the fixed-potential metal pattern (electromagnetic shielding film) is formed of the uppermost metal layer and also the transmission circuit consisting of the multi-layered metal layer is formed thereunder. Therefore, the electromagnetic radiation generated when the high frequency signal is transmitted to the transmission circuit can be reduced.

According to the liquid crystal display device manufacturing method of the present invention, the transparent conductive film and the metal layer are formed in sequence on the insulating film in the display portion and the peripheral circuit portion, then photoresist is coated on the metal layer, then this photoresist is exposed to form a wiring latent image in the peripheral circuit portion and form a pixel electrode latent image in the display portion, and then the resist exposure step of irradiating the exposure light to at least the pixel electrode latent image at a low exposure amount is applied.

According to this, if the wiring latent image and the pixel electrode latent image are changed into visible images as patterns by developing the resist, the thickness of the wiring resist pattern is thinner than that of the pixel electrode resist pattern. Therefore, after the wiring patterns and the pixel electrodes are formed by etching the metal layer and the transparent conductive film while using these resist patterns as a mask, the pixel electrode resist pattern can be removed while thinning the wiring resist pattern by the oxygen plasma, etc., whereby the metal layer on the pixel electrodes can be selectively removed. That is, the wiring pattern and the transparent pixel electrode can be formed simultaneously by one resist pattern forming step.

Also, according to the present invention, if the uppermost wiring and the pixel electrodes are formed together on the same insulating film in the peripheral circuit portion and the display portion, the metal layer is formed on areas except the display region by using the sputter mask and also the transparent conductive film is formed on the insulating film in the display region and on or under the metal layer in peripheral circuit portion by the sputter method.

Therefore, according to one photolithography step, the pixel electrode consisting of the transparent conductive film can be formed in the display portion and also the wirings having the double-layered structure consisting of the transparent conductive film and the metal layer can be formed in the peripheral circuit portion.

DETAILED DESCRIPTION OF THE PREFERRED EMBODIMENTS

Embodiments of the present invention will be explained with reference to the accompanying drawings hereinafter.

(First Embodiment)

FIGS. 2A to 2M are sectional views showing steps of forming a thin film transistor (TFT) substrate of a liquid crystal display device according to a first embodiment of the present invention.

Figure 1:
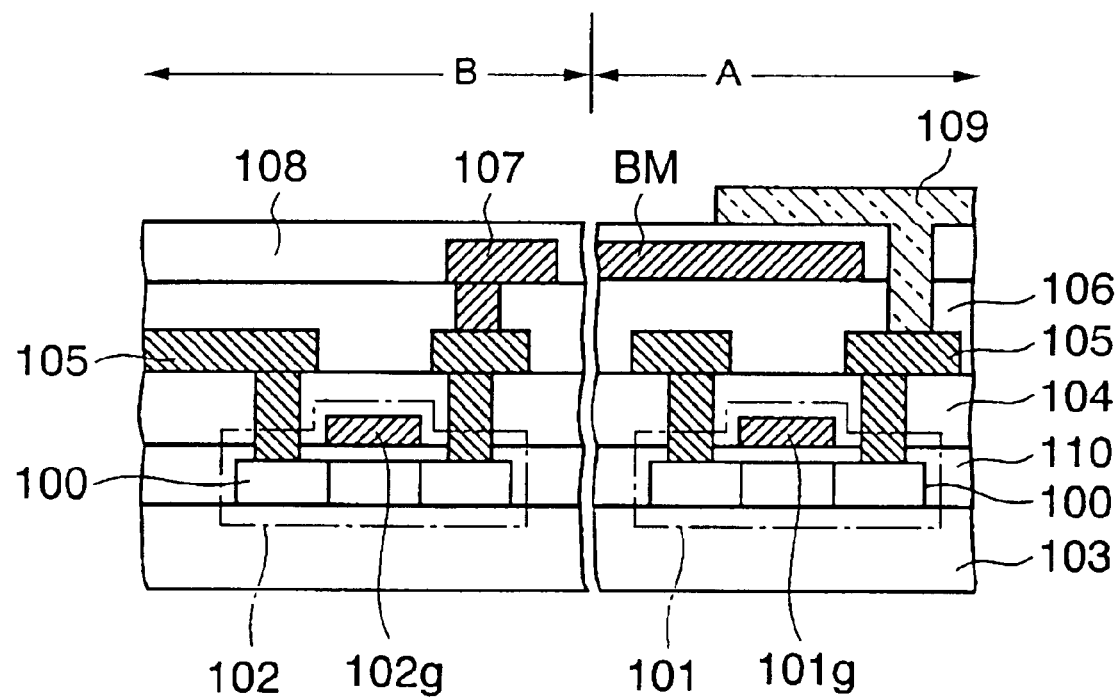
FIG. 1 is a sectional view showing the prior art of the TFT substrate of the liquid crystal display device.
Figure 2A:
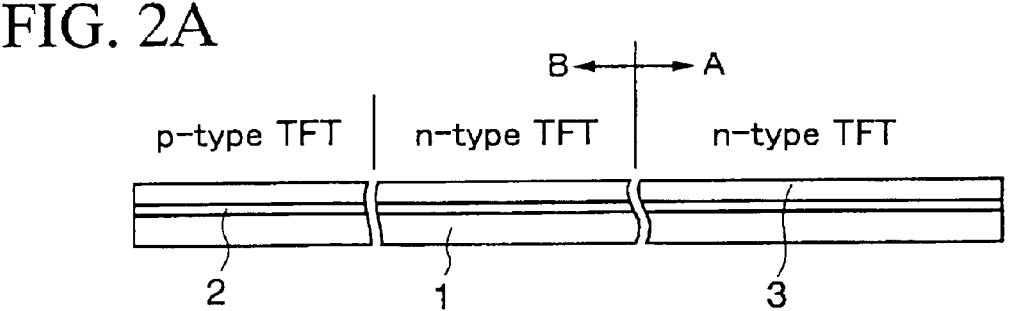
FIGS. 2A to 2M are sectional views showing steps of manufacturing a TFT substrate of a liquid crystal display device according to a first embodiment of the present invention.

First, as shown in FIG. 2A, a silicon oxide ($SiO_2$) film is formed as an underlying insulating film 2 on an insulating substrate (substrate) 1 such as glass, quartz, resin film, etc. to have a thickness of 150 to 300 nm, preferably 200 nm. The underlying insulating film 2 may be formed as a double-layered structure in which a silicon nitride film of 50 nm thickness and a silicon oxide film of 200 nm thickness are formed sequentially. In this case, a #1737 glass substrate manufactured by Corning Co. Ltd., for example, is employed as the insulating substrate.

Then, an amorphous silicon film 3 is formed continuously on the underlying insulating film 2 to have a thickness of 20 to 100 nm, preferably 40 to 50 nm. These films are formed continuously by the PECVD (Plasma-Enhanced CVD) method, for example. Then, the insulating substrate 1 is put in the nitrogen atmosphere, and then the amorphous silicon film 3 is annealed at 450° C. for 1 hour, whereby the hydrogen is extracted from the amorphous silicon film 3.

Figure 2B:
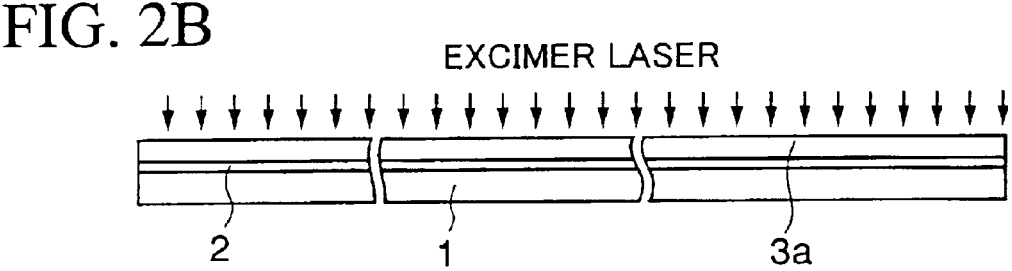

Then, as shown in FIG. 2B, the amorphous silicon film 3 is changed into a polysilicon film 3a by irradiating the excimer laser, which has the wavelength of 308 nm and the energy density of 300 to 400 $mJ/cm^2$, preferably 320 to 350 $mJ/cm^2$, onto the overall surface of the amorphous silicon film 3.

In this case, the amorphous silicon film 3 is formed of not amorphous-silicon hydride (a-Si:H) but low hydrogen-concentration amorphous silicon (a-Si), the annealing step to extract the hydrogen from the silicon film is not needed. The low hydrogen-concentration amorphous silicon is the amorphous silicon whose hydrogen containing amount is less than 1%, for example.

Figure 2C:
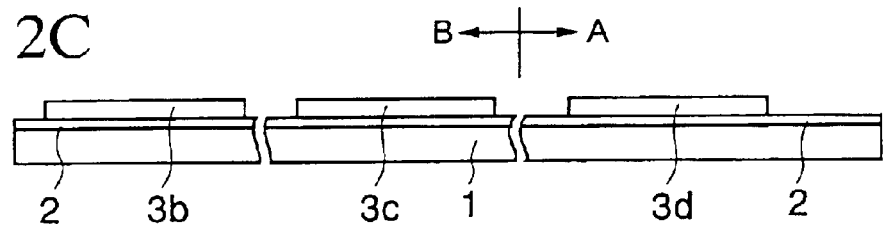

Then, as shown in FIG. 2C, by patterning the polysilicon film 3a by using the resist (not shown) and the reactive ion etching, island-like polysilicon patterns 3b, 3c, 3d are formed in plural transistor forming regions of the display portion A, the peripheral circuit portion B, and other circuit portions (not shown) respectively and also the polysilicon film 3a is left in short-bar regions (not shown) that connect the transistors.

Figure 2D:
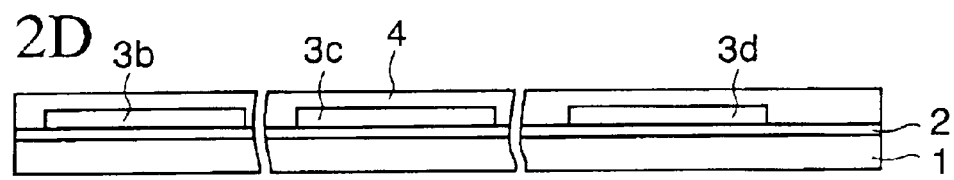

Then, as shown in FIG. 2D, an $SiO_2$ film of 80 to 150 nm thickness is formed as a gate insulating film 4 on the underlying insulating film 2 and the island-like polysilicon patterns 3b, 3c, 3d by the PECVD method. As the gate insulating film 4, a double-layered structure that is obtained by forming continuously the silicon oxide ($SiO_2$) film, which has a film thickness of 100 to 150 nm, preferably 120 nm, and the silicon nitride ($SiN_x$) film, which has a film thickness of 30 to 100 nm, preferably 40 to 50 nm, by virtue of the PECVD method, for example, may be employed.

In addition, an aluminum alloy (metal), e.g., Al—Nd, Al—Sc, is formed on the gate insulating film 4 by the sputter method to have a thickness of 300 to 500 nm, preferably 350 nm. The aluminum alloy is the first-layer metal layer (first metal layer).

Figure 2E:
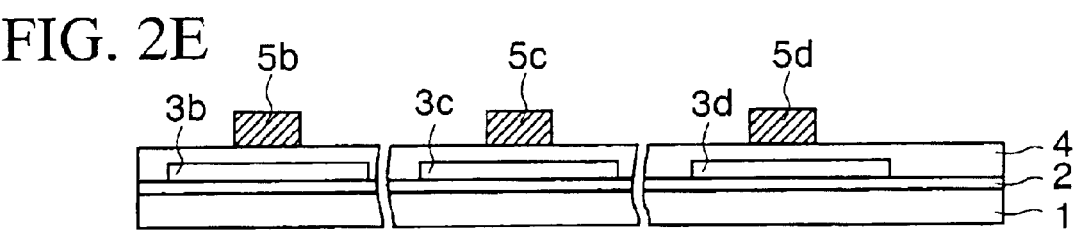

Then, the aluminum alloy is patterned by the photolithography method using the resist pattern. Thus, as shown in FIG. 2E, gate electrodes 5b, 5c, 5d passing over the island-like polysilicon patterns 3b, 3c, 3d and other first-layer wiring pattern are formed. A particular example of the first-layer wiring pattern will be described later.

After this, the gate electrodes 5b, 5c, 5d are etched by the wet etching (isotropic etching) to assure the LDD region widths, and then the gate electrodes 5b, 5c, 5d are further narrowed by the over-etching, whereby LDD (Lightly Doped Drain) region widths are formed on both sides of the gate electrodes 5*b*, 5*c*, 5*d*. Usually the LDD region width is controlled in the range of 0.5 to 1.5 μm to assure the TFT reliability. In the first embodiment, the LDD region width ΔL is controlled smaller than 0.8 μm by adjusting the side-etching time. Of course, ΔL can be controlled freely in the range of 0.5 to 1.5 μm by adjusting the side-etching time. After the widths of the gate electrodes 5*b*, 5*c*, 5*d* are defined, the resist pattern left on the gate electrodes 5*b*, 5*c*, 5*d* is peeled off.

Figure 2F:
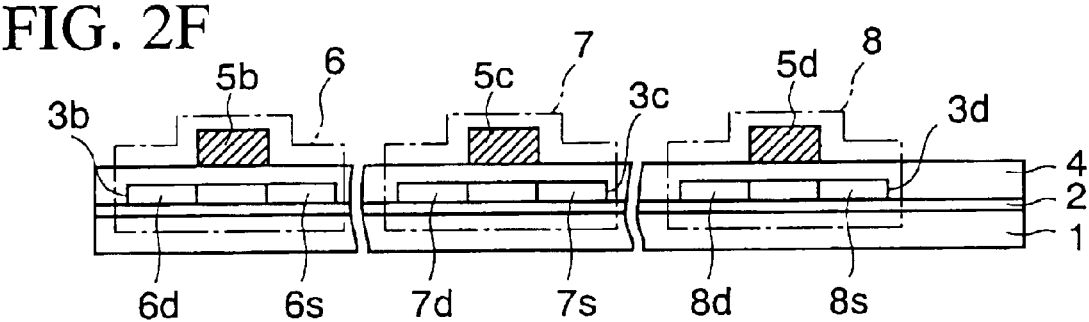

Then, as shown in FIG. 2F, source regions and drain regions are formed by doping the impurity into the island-like polysilicon patterns 3*b*, 3*c*, 3*d* on both sides of the gate electrodes 5*b*, 5*c*, 5*d*.

In the doping of the impurity, the phosphorus ion ($P^+$) is doped into the polysilicon patterns 3*b*, 3*c*, 3*d* on the overall surface of the insulating substrate 1 by two-step doping method by virtue of the plasma doping equipment having the ion source in the RF discharge system or the DC discharge system. As the gas for supplying the phosphorus, phosphine ($PH_3$) that is diluted into 1 to 5% is employed.

The doping in the first step and the second step intend to form the low resistance $n^+$-regions in source regions 6*s*, 7*s*, 8*s* and drain regions 6*d*, 7*d*, 8*d* of the polysilicon patterns 3*b*, 3*c*, 3*d* and in the polysilicon patterns in the short bar regions and also form the relatively high resistance $n^-$-regions in the LDD regions.

As the typical conditions of the first step doping, the ion acceleration voltage is set to 10 keV and the phosphorus dosage is $5 \times 10^{14}$ to $5 \times 10^{15}$ ions/cm$^2$. As the typical conditions of the second step doping, the ion acceleration voltage is set to 70 keV and the phosphorus dosage is $5 \times 10^{12}$ to $5 > \times 10^{14}$ ions/cm$^2$. According to such conditions, the dopant is passed through the gate insulating film 4 and introduced into the polysilicon patterns 3*b*, 3*c*, 3*d*.

The greatest merit of the two-step doping method is that the $n^+$-region and the $n^-$-region can be formed in a self-alignment fashion by one doping step not to break down the vacuum. The above doping is applied to the island-like polysilicon patterns 3*b*, 3*c* in the p-type TFT 6 forming region and the n-type TFT 7 forming region in the peripheral circuit portion B, the island-like polysilicon pattern 3*d* in the n-type TFT 8 forming region in the display portion A, other TFT silicon patterns, and the short bar regions. For this reason, the inversion doping for inverting the $n^+$-type into the $p^+$-type and the $n^-$-type into the $p^-$-type in the source regions and the drain regions of the $p^-$-type TFT respectively must be executed.

Therefore, the two-step boron ($B^+$) doping is applied to the p-type regions by using the plasma doping equipment having the ion source in the RF or DC discharge system in the situation that the n-type TFTs and the n-type short-bar regions are covered with the photoresist (not shown). The $B^+$ doping in the first step and the second step in the inversion doping intends to form the low resistance $p^+$-regions in the source regions and the drain regions and the short-bar regions respectively and also form the relatively high resistance $p^-$-regions in the LDD regions. As the typical conditions of the first step doping in the inversion doping, the ion acceleration voltage is set to 10 keV and the boron dosage is $5 \times 10^{14}$ to $5 \times 10^{15}$ ions/cm$^2$. As the typical conditions of the second step doping, the ion acceleration voltage is set to 60 keV and the boron dosage is $5 \times 10^{12}$ to $1 \times 10^{14}$ ions/cm$^2$.

The photoresist used in the inversion doping is peeled off, and then the activation of the dopant is carried out by using the excimer laser method that employs the wavelength of 308 nm and the energy density of 250 to 300 mJ/cm$^2$ or the lamp heating method that employs the halogen lamp, etc.

Thus, the sheet resistance of the source regions and the drain regions is set to less than 5 k Ω, preferably less than 1 k Ω and also the sheet resistance of the LDD regions is set to $1 \times 10^4$ to $5 \times 10^6$ Ω/□, preferably $5 \times 10^4$ to $1 \times 10^5$ Ω/□.

With the above, the formation of the n-type TFT and the p-type TFT and the silicon short bars is completed. In the first embodiment, the n-type TFT 8 is formed in the display portion A and the n-type and p-type TFTs 6, 7 are formed in the peripheral circuit portion B, but such transistors are not limited to them.

Figure 2G:
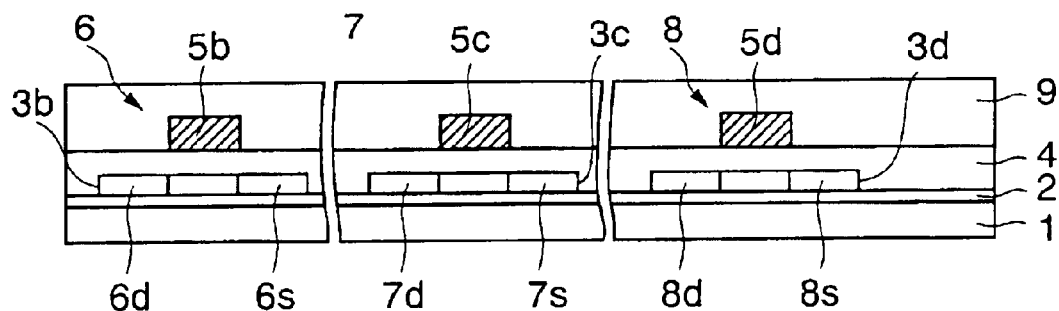

Then, as shown in FIG. 2G, the silicon nitride is formed on the gate insulating film 4 and the gate electrodes 5*b*, 5*c*, 5*d* by the PECVD method to have a thickness of 300 to 600 nm, preferably 400 nm. Thus, this silicon nitride is employed as a first interlayer insulating film 9. Therefore, the TFTs 6, 7, 8 are covered with the first interlayer insulating film 9. In this case, the silicon oxide may be formed as the first interlayer insulating film 9 in place of the silicon nitride.

Figure 2H:
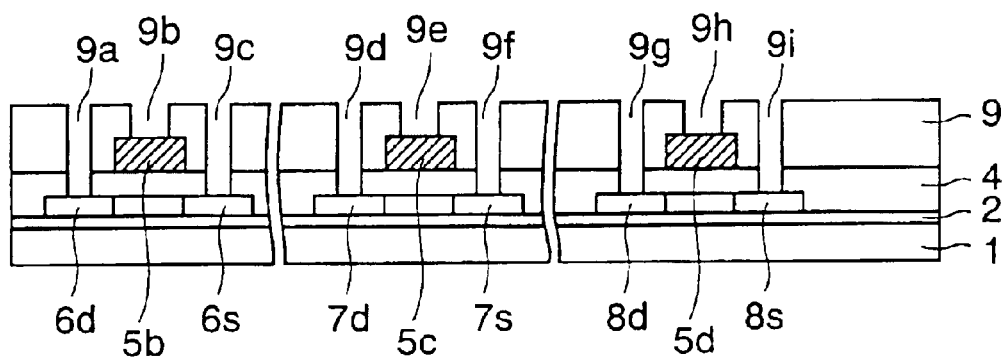

Then, as shown in FIG. 2H, contact holes 9*a* to 9*i* are formed on the source regions 6*s*, 7*s*, 8*s* and the drain regions 6*d*, 7*d*, 8*d* and the gate electrodes 5*b*, 5*c*, 5*d* of the p-type TFT 6 and the n-type TFTs 7, 8 by patterning the first interlayer insulating film 9 by virtue of the RIE method and the photolithography method using the resist patterns. As the etching gas of the first interlayer insulating film 9, $CF_4$ and $SF_6$ are employed.

Then, a multi-layered metal film is formed in all contact holes 9*a* to 9*i* and on the first interlayer insulating film 9 by the sputter method. As the multi-layered metal film, for example, there is a triple-layered structure in which a Ti film of 100 nm thickness, an Al film of 200 nm thickness, and a Ti film of 100 nm thickness are formed in sequence. This multi-layered metal film is the second-layer metal layer (second metal layer).

Figure 2I:
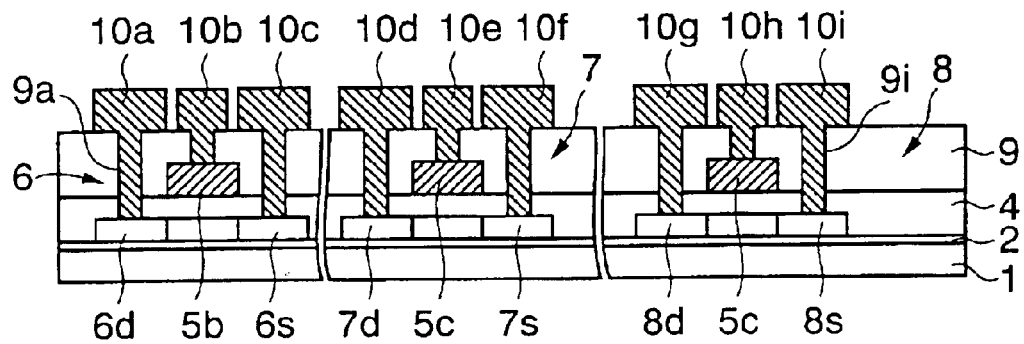

Then, as shown in FIG. 2I, wiring patterns 10*a* to 10*i*, that are extended from the source regions 6*s*, 7*s*, 8*s* and the drain regions 6*d*, 7*d*, 8*d* and the gate electrodes 5*b*, 5*c*, 5*d* via the contact holes 9*a* to 9*i*, are formed by patterning the multi-layered metal film by means of the photolithography method. In this photolithography method, the RIE method is employed for the etching and also the chlorine etching gas is employed as the etching gas for the multi-layered metal film (second-layer metal layer) consisting of Ti/Al/Ti. A wiring pattern 10 g connected electrically to the drain region 8*d* of the TFT 8 and the drain bus line, a wiring pattern 10*h* extended from the gate electrode 5*d* of the TFT 8, and a wiring pattern 10*i* connected to the source region 8*s* of the TFT 8 and then extended upward are provided on the first interlayer insulating film 9 in the display portion A.

The wiring patterns 10*a* to 10*i* on the first interlayer insulating film 9 are the second-layer wiring patterns.

Then, a silicon nitride film 11 for covering the intermediate wiring patterns is formed on the first interlayer insulating film 9 by the PECVD method to have a thickness of 50 to 200 nm, preferably 100 nm. In addition, a first resin film 12 such as photosensitive polyimide resin, acrylic resin, etc. is formed on the silicon nitride film 11. Preferably the first resin film 12 should have a film thickness of more than 1.5 μm to get its planarized surface. The first resin film 12 and the underlying silicon nitride film 11 constitute a second interlayer insulating film 13.

Figure 2J:
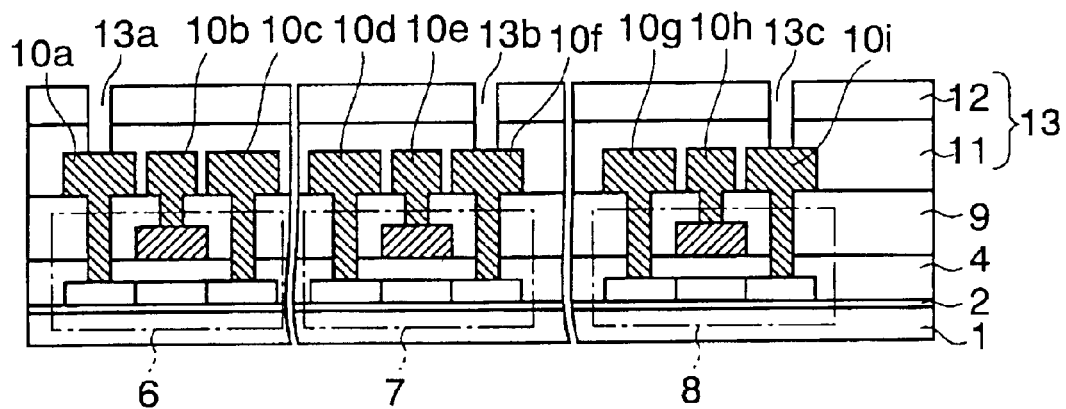

Then, as shown in FIG. 2J, holes 13*a*, 13*b*, 13*c* are formed by exposing/developing the first resin film 12. For example, the hole 13*c* is formed on the second-layer wiring pattern 10*i* that is electrically connected to the source region 8*s* of the TFT 8 in the display portion A, and also the holes 13*a*, 13*b* are formed on the second-layer wiring patterns 10a, 10f that are electrically connected to the drain region 6d, the source region 7s of the TFTs 6, 7 in the peripheral circuit portion B respectively.

Then, the silicon nitride film 11 under the first resin film 12 is etched through via-holes in the first resin film 12. In this case, in order to control the etching rate of the silicon nitride film 11 to the first resin film 12, a ratio of $CF_4$, $SF_6$, and $O_2$ that are employed as the etching gas of the silicon nitride film 11 is adjusted.

Figure 2K:
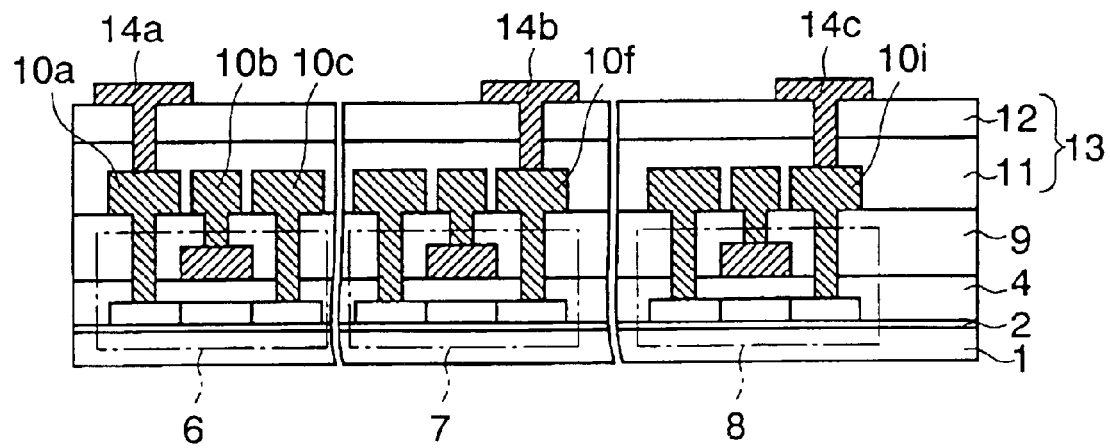

Then, a titanium film of 100 to 300 nm thickness is formed on the first resin film 12 and in the holes 13a, 13b, 13c as a third-layer metal layer (third metal layer) by the sputter method. Then, as shown in FIG. 2K, the third-layer metal layer is patterned by the photolithography method using the chorine gas and RIE to form third-layer wiring patterns 14a, 14b, 14c. In this case, a metal material film such as an Al film, an Al multi-layered wiring film, Al alloy and others may be employed as the third-layer metal layer.

As a result, in the peripheral circuit portion B, a plurality of TFTs 6, 7 are electrically connected via the metal pattern formed of the first-layer metal layer, the second-layer wiring patterns 10a to 10i, and the third-layer wiring patterns 14a, 14b, 14c. Also, in the display portion A, the source region 8s of the TFT 8 is extended onto the second interlayer insulating film 13 via the second-layer wiring pattern 10i and the third-layer wiring pattern 14c.

Figure 2L:
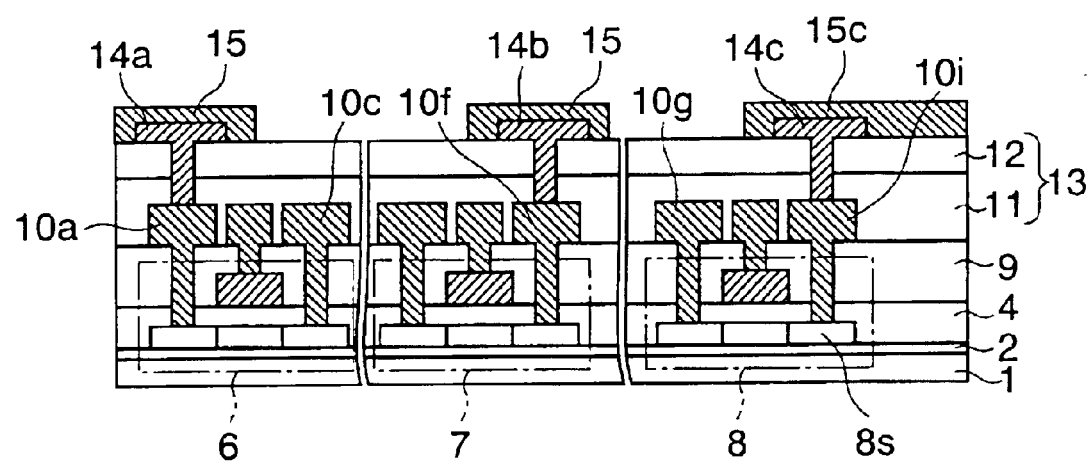

Then, a transparent conductive film 15 such as indium oxide material, ITO, etc. is formed on the first resin film 12 and the third-layer wiring patterns 14a, 14b, 14c by the sputter method to have a thickness of 50 to 100 nm, preferably 70 nm. Then, as shown in FIG. 2L, a pixel electrode 15c that is extracted from the source region 8s of the TFT 8 in the display portion A to extend over the third-layer wiring pattern 14c and the pixel forming region is formed by patterning the transparent conductive film 15 by virtue of the normal photolithography method employing the wet etching.

In addition, in the peripheral circuit portion B, the transparent conductive film 15 is left to form a shape along the third-layer wiring patterns 14a, 14b except the case where the third-layer wiring patterns 14a, 14b are formed of Al or Al alloy, whereby the transparent conductive film 15 covers upper surfaces and side surfaces of the third-layer wiring patterns 14a, 14b.

In case the third-layer wiring patterns 14a, 14b, 14c are formed of Al or Al alloy, electrolytic corrosion is caused when the ITO film is formed directly on the third-layer wiring patterns 14a, 14b, 14c. Therefore, various measures in step or structure such that an electrolytic-corrosion preventing conductive film, e.g., a Ti film, is formed on the third-layer wiring patterns 14a, 14b, 14c, or the like. In this case, the ITO film also acts as a protection film for the third-layer wiring patterns 14a, 14b in the peripheral circuit portion B. However, in the peripheral circuit portion B, an operation can be carried out unless the transparent conductive film 15 is left on the third-layer wiring patterns 14a, 14b.

Then, the films on the substrate is heated at the temperature of 200 to 300° C. in the hydrogen ($H_2$) mixed gas atmosphere or the nitrogen ($N_2$) atmosphere. Such heating process is effective for the performance improvement of the TFTs and the characteristic stabilization of the first resin film 12.

Figure 3:
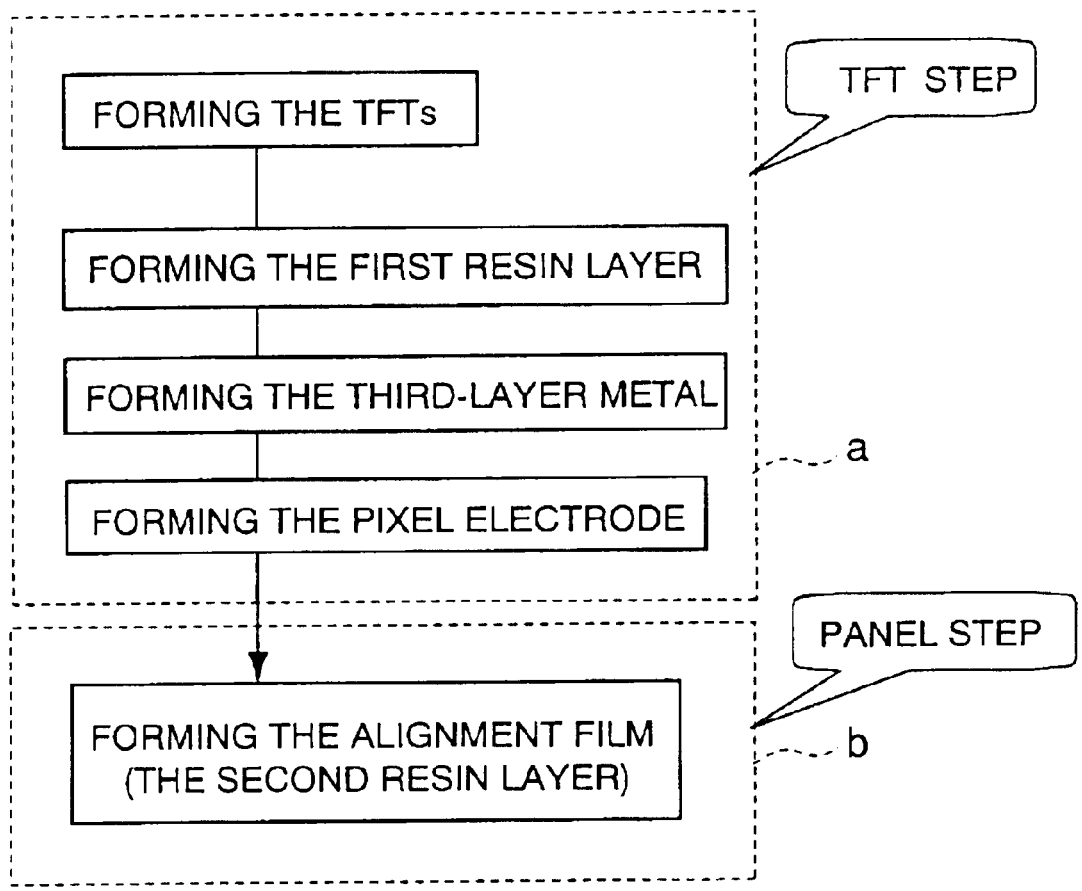
FIG. 3 is a flowchart showing formations of the TFT substrate and an alignment film of the liquid crystal display device according to the first embodiment of the present invention.

With the above steps, as shown in a of FIG. 3, the TFT substrate forming steps are ended.

Figure 2M:
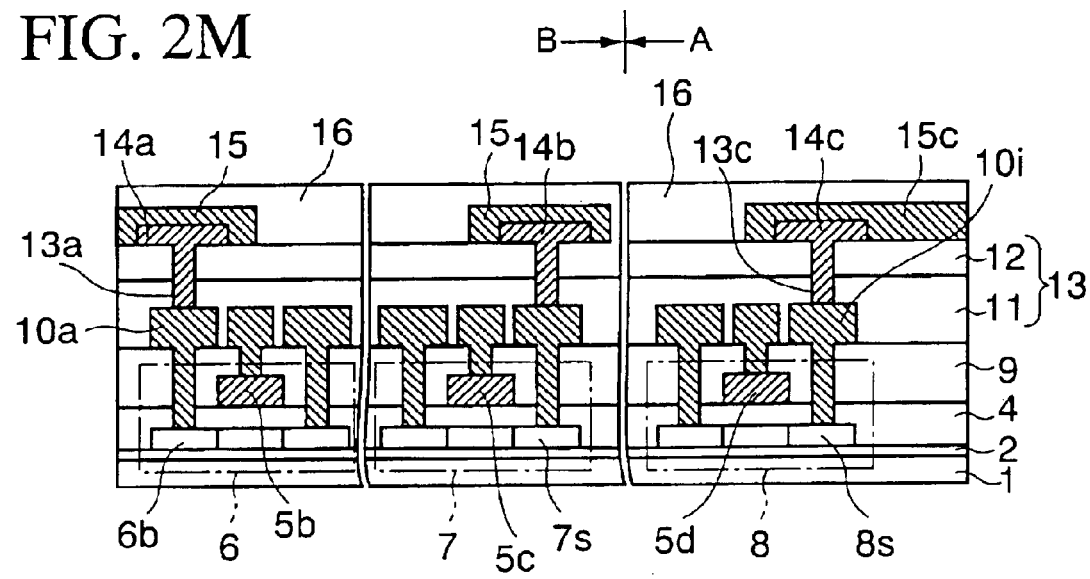
Figure 4:
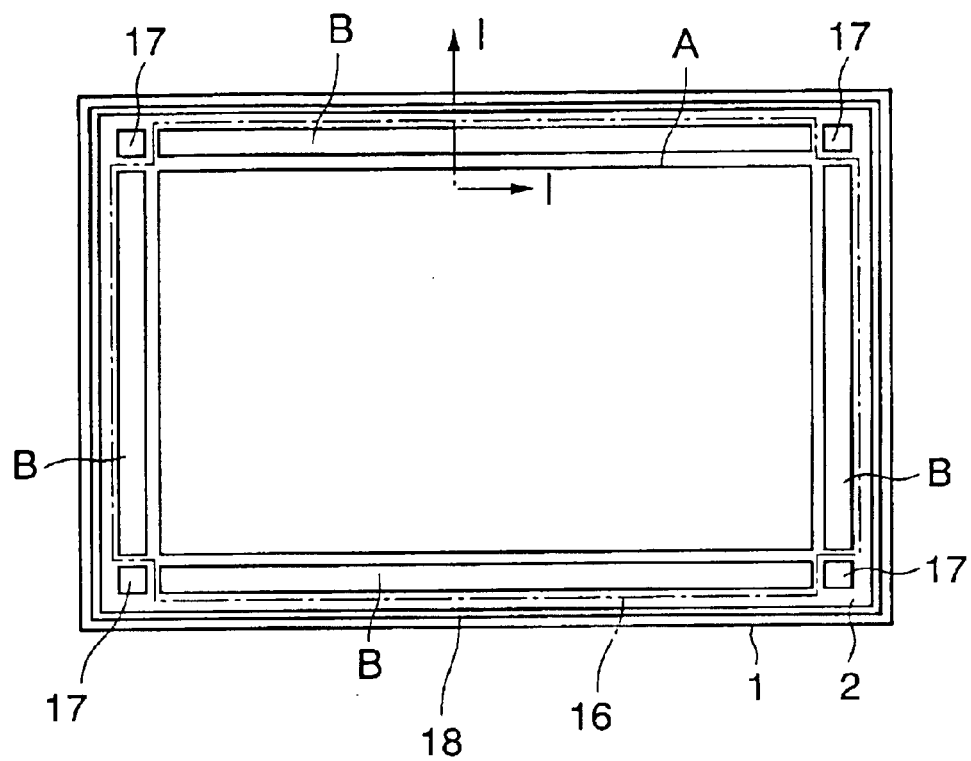
FIG. 4 is a plan view showing the TFT substrate according to the first embodiment of the present invention.

Subsequently to this, as shown in FIG. 2M and FIG. 4, an alignment film 16 is printed on the second interlayer insulating film 13 in the display portion A and the peripheral circuit portion B, so that the pixel electrode 15c and the third-layer wiring patterns 14a, 14b are covered with this alignment film 16. The alignment film 16 consists of a resin such as polyimide resin.

In the prior art, the third-layer wiring patterns 14a, 14b, 14c are covered with the uppermost protection insulating film, that is separate from the alignment film, and then the alignment film is formed on the uppermost protection insulating film in the panel step. In contrast, in the first embodiment, as shown in b of FIG. 3, the formation of the uppermost protection insulating film is omitted and is substituted for the alignment film 16 that is formed in the panel step.

Meanwhile, in a plan view of FIG. 4, transfer electrodes 17 that are arranged near four corners of the insulating substrate 1 are formed to extend the common electrodes, which are formed on the opposing substrate side, to the TFT substrate side. The silver paste, the spherical material in which nickel or gold is coated on the ultraviolet cured adhesives, etc. may be employed. It should take care that the alignment film 16 for covering the peripheral circuit portion B and the display portion A are not formed on the transfer electrodes 17 and their peripheral areas.

In FIG. 4, a seal 18 is formed on a peripheral area of the insulating substrate 1 like a frame to surround the display portion A, the peripheral circuit portion B, the transfer electrodes 17 and the alignment film 16. Also, in the peripheral circuit portion B of FIG. 4, the uppermost wiring patterns 14a, 14b, 14c may be covered with a sealing resin film formed in place of the alignment film. In addition, the seal 18 may be formed on the third-layer metal layer after the third-layer metal layer is left in the sealing region. The adhesiveness of the seal 18 is never made worse by this formation. No trouble of the electric insulation is caused since the insulating property of the sealing resin is very good.

By the way, the liquid crystal is dropped onto the insulating substrate 1 on the TFT side or the opposing substrate in FIG. 4 and then the insulating substrate 1 on the TFT side and the opposing substrate are pasted together, so that the liquid crystal display device is formed. A sectional view of the liquid crystal display device taken along a I—I line in FIG. 4 is shown in FIG. 5.

Figure 5:
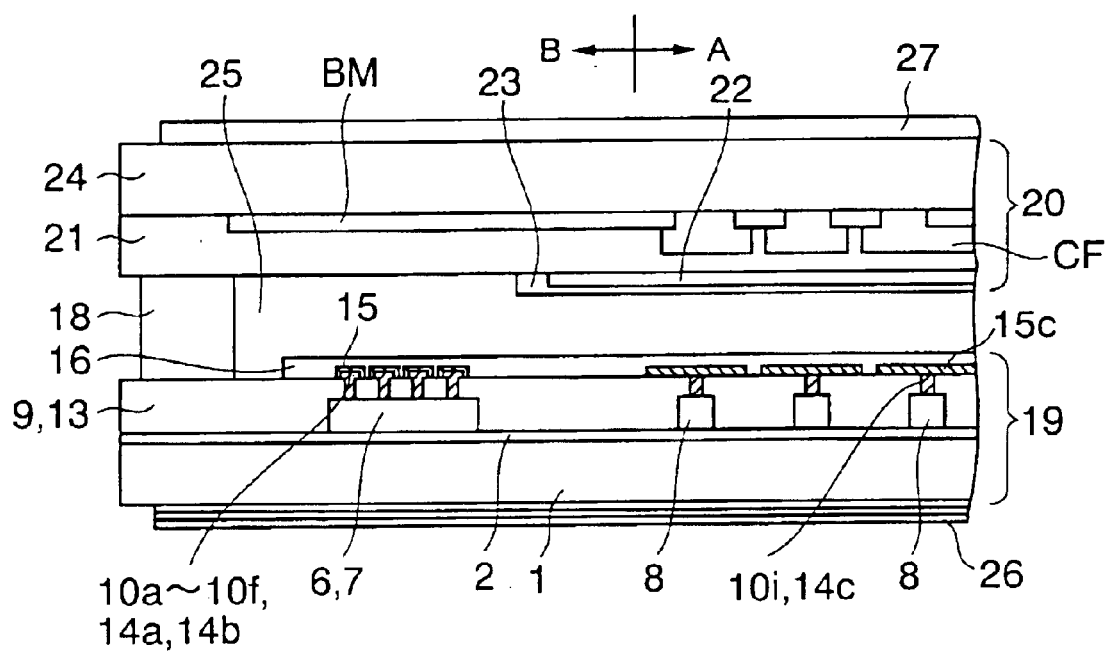
FIG. 5 is a partial sectional view showing the liquid crystal display device according to the first embodiment of the present invention.

In the liquid crystal display device shown in FIG. 5, a TFT substrate 19 has the display portion A in which the pixel TFTs 8 and the pixel electrodes 15c are formed on the insulating substrate 1, and the peripheral circuit portion B in which the inverter and the analog switch having the TFTs 6, 7 are provided. Also, an opposing substrate 20 is constructed by forming a planarization film 21, the black matrix BM, the color filter CF, a transparent opposing electrode 22, an alignment film 23, etc. on a substrate 24. The seal 18 constituting the cell gaps and the liquid crystal 25 sealed by the seal 18 are put between the TFT substrate 19 and the opposing substrate 20. Further, optical films 26, 27 such as a polarization plate, etc. are formed on the outside of the TFT substrate 19 and the outside of the opposing substrate 20 respectively.

In the opposing substrate 20, the planarization film 21 on the color filter CF may be omitted. Also, it is desired in the opposing substrate 20 that, in order to eliminate the influence of the inclination of the liquid crystal molecules in the display portion A, the alignment film 23 should not be formed on the portions that oppose to the peripheral circuit portion B. In addition, the pixel electrodes 15c are connected to the source region 8s of the TFT 8 via the second-layer wiring pattern 10i. But one hole (not shown) may be formed in the gate insulating film 4 and the first interlayer insulating film 9, and then the transparent conductive film constituting the pixel electrodes 15c may be connected directly to the source region 8s via this hole.

Figure 6:
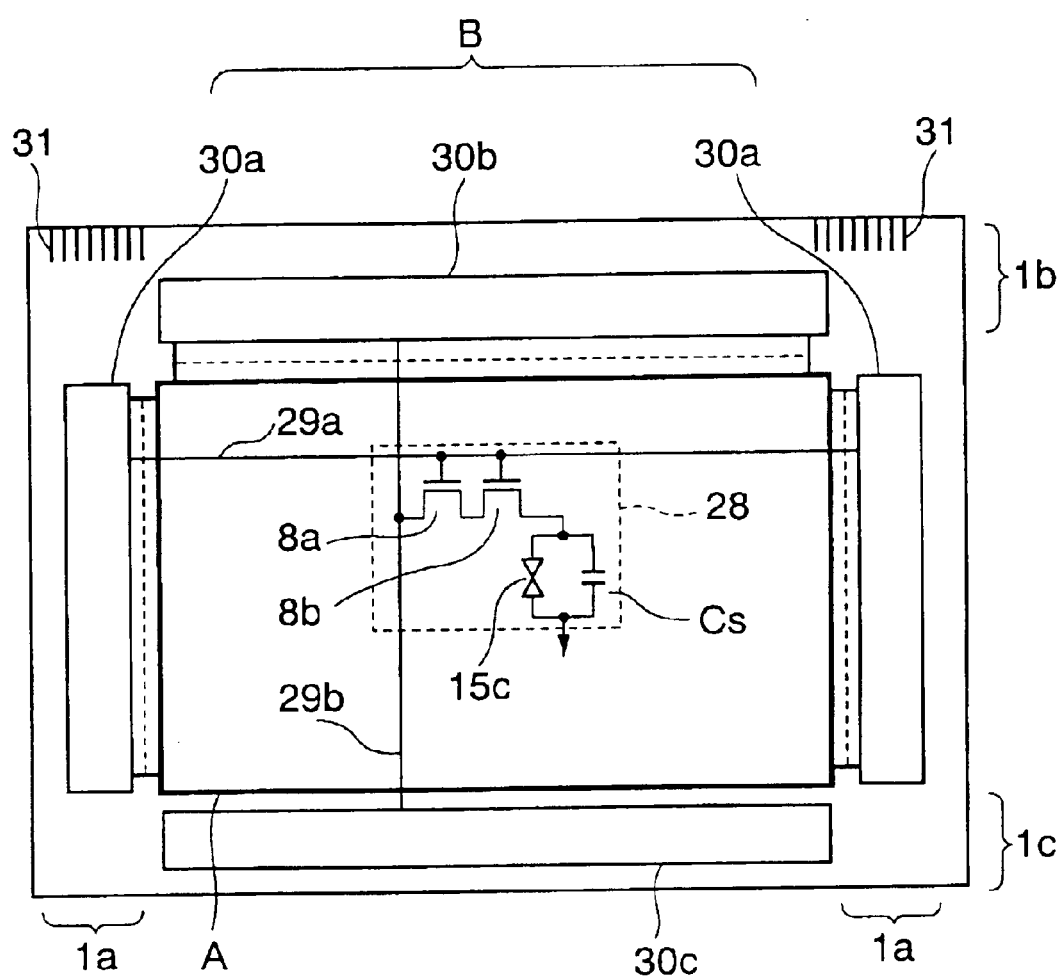
FIG. 6 is block circuit diagram showing the TFT substrate according to the first embodiment of the present invention.

FIG. 6 is a block circuit diagram showing the above liquid crystal display device.

The liquid crystal display device shown in FIG. 6 shows three portions of the display portion A having a plurality of pixel cells, the peripheral circuit portion B, and the input terminal portion C. The circuit shown in FIG. 6 can be applied similarly to other embodiments to be described later.

In the display portion A, a plurality of pixel cells 28 each consisting of the pixel electrode 15c and the storage capacitance Cs, which are connected to one of source electrodes of a double-gate TFT 8a and a double-gate TFT 8b, are provided such that these pixel cells 28 are arranged in rows and columns like a matrix fashion. Also, the display portion A has gate bus (scanning bus) lines 29a that are connected to gate electrodes of the TFTs 8a, 8b and arranged horizontally to select the pixel TFTs, and data bus lines 29b that are connected to drain electrodes of the TFTs 8a and arranged vertically to transmit the data signal to the pixel cells 28, etc.

For instance, in the display portion A of the UXGA format, the total number of the pixel cells is 4800×1200, the total number of the gate bus lines 29a is 1200, and the total number of the data bus lines 29b is 4800.

The peripheral circuit portion B is formed on a frame region 1a around the display portion A on the insulating substrate 1 made of glass, and consists of scanning line side circuits 30a, a data side peripheral circuit 30b, an electrostatic prevention/repair/preliminary charge circuit 30c, etc.

The scanning line side circuits 30a are arranged in the frame region 1a on the left and right sides of the display portion, and has a circuit configuration to generate a signal for selecting the gate bus lines 29a. Also, the data side peripheral circuit 30b is arranged in an upper frame region 1b of the insulating substrate 1, and has a circuit configuration to convert a digital video signal being input from the input terminal portion 31 into an analog tone signal and then feed the data to the display portion A at a predetermined timing. The electrostatic prevention/repair/preliminary charge circuit 30c is arranged in a lower frame region 1c of the insulating substrate 1.

The input terminal portion 31 is composed of input terminal groups connected to two locations (ports). At this time, 24 or 48 digital signal lines are provided to each port, and also various control signal terminals for driving the scanning line side circuit 30a are provided.

According to the first embodiment, effects and advantages described hereunder will be obtained.

A thickness of the first resin film 12 is more than 1.5 μm and a relative dielectric constant thereof is small such as about 3.0. Therefore, the floating capacitances that exist between the wiring patterns 14a, 14b, 14c formed of the third-layer metal layer on the first resin film 12 and the wiring patterns 5b to 5d, 10a to 10i formed of the first-layer metal layer and the second-layer metal layer can be reduced, and thus the operating frequency of the peripheral circuit portion B can be largely improved.

In contrast, like the prior art, if an inorganic insulating film such as an $SiN_x$ or $TEOS$-$SiO_2$ film is employed as the second interlayer insulating film 13, a thick film thickness cannot be obtained by the CVD film forming technology. In addition, since the relative dielectric constant 7 to 9 of $SiN_x$ and the relative dielectric constant 3.8 to 4.2 of $SiO_2$ are larger than that of the organic resin film, the parasitic capacitances between the third-layer wiring patterns 14a, 14b, 14c and the underlying other wiring patterns 5b to 5d, 10a to 10i are increased, and thus a high-frequency operation of the peripheral circuit portion B becomes difficult.

Also, if the operation frequency of the peripheral circuit portion B is increased, it is possible to provide various high-frequency circuits on the data side. For example, it is possible to construct the high performance/multi-function peripheral circuits, in which the digital driver circuit, the I/O circuits, the data processing circuit, the memory array, the CPU, etc., each can be operated at 40 MHz to 100 MHz, are provided, within the frame regions 1a, 1b, 1c of the insulating substrate 1. As a result, it is possible to construct the sheet computer.

In addition, in light of the layout design of the peripheral circuit portion B, the parasitic capacitances between the third-layer wiring patterns 14a, 14b, 14c and the underlying wiring patterns 5b to 5d, 10a to 10i should seldom be taken in consideration. Therefore, the margin of circuit design is enhanced, and also the TFT integrated circuit of high density can be fabricated.

Further, the parasitic capacitances between the third-layer wiring patterns 14a, 14b, 14c and the underlying wiring patterns 5b to 5d, 10a to 10i should not be considered in the peripheral circuit portion B. Therefore, the third-layer wiring patterns 14a, 14b can be arranged close to the underlying wiring patterns 5b to 5d, 10a to 10i in the arrangement in the lateral direction, and thus an occupied area of the peripheral circuit portion B can be reduced. As a result, the lightweight and compact peripheral-circuit integrated liquid crystal display device having the narrow frame liquid crystal display device can be fabricated.

In the first embodiment, the alignment films 16 are formed as the second resin film on the third-layer wiring patterns 14a, 14b in the peripheral circuit portion B. Therefore, in contrast to the prior art in which a single insulating film is formed, the fabrication process can be simplified and also the production cost can be reduced.

In the first embodiment, the transparent conductive film 15 made of the metal oxide is formed again on the third-layer wiring patterns 14a, 14b in the peripheral circuit portion B. Therefore, the third-layer wiring patterns 14a, 14b can be protected by the transparent conductive film 15 before the panel step is carried out. In addition, since the third-layer wiring patterns 14a, 14b are covered with the alignment film 16, the long-term reliability of the third-layer wiring patterns can be assured.

Further, since other insulating film is not present between the third-layer wiring patterns 14a, 14b and the transparent conductive film 15 in the peripheral circuit portion B, the production process of the TFT substrate can be simplified and thus a cost-down effect can be expected.

(Second Embodiment)

Steps of manufacturing a peripheral-circuit integrated polysilicon reflection type liquid crystal display device employing the triple-layered metal wiring and the double-layered metal wiring will be explained as a second embodiment hereunder.

First, as shown in FIG. 2A to FIG. 2J, the steps required until the TFTs 6 to 8 are formed on the insulating substrate 1, then the first interlayer insulating film 9, the second-layer wiring patterns 10a to 10i, and the second interlayer insulating film 13 are formed thereon, and then the holes 13a, 13b, 13c are formed in the second interlayer insulating film 13 are similar to those in the first embodiment. Thus, their explanation will be omitted hereunder.

Figure 7A:
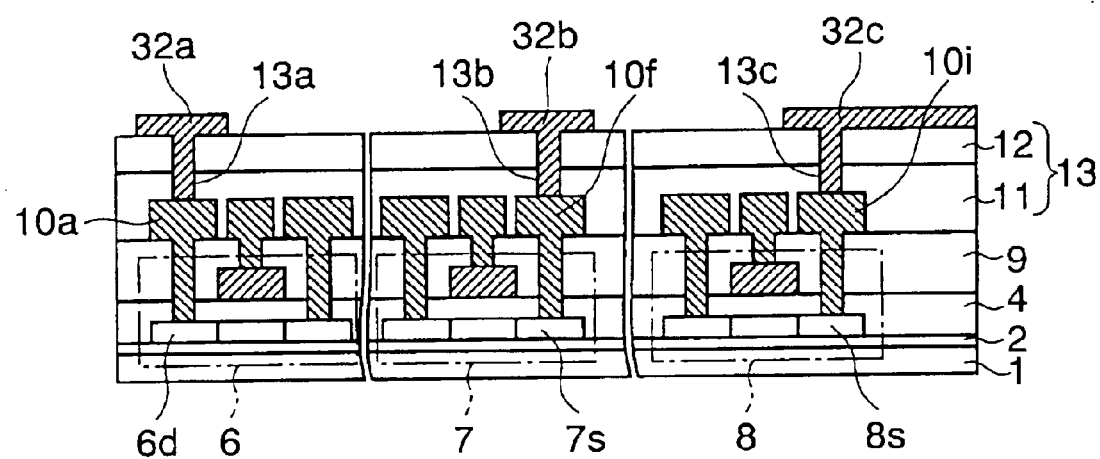
FIGS. 7A and 7B are sectional views showing steps of manufacturing a TFT substrate of a liquid crystal display device according to a second embodiment of the present invention.

Then, as shown in FIG. 7A, third-layer wiring patterns 32a, 32b that are electrically connected to the TFTs 6, 7 via the holes 13a, 13b in the first resin film 12 are formed in the peripheral circuit portion B. Also, a reflection pixel electrode 32c that is connected to the source region 8s of the TFT 8 via the hole 13c in the first resin film 12 is formed in the display portion A.

The third-layer wiring patterns 32a, 32b and the reflection pixel electrode 32c are formed by following steps. An upper surface of the reflection pixel electrode 32c serves as a reflection surface.

First, as the third-layer metal layer serving also as the reflection conductive film, a titanium film of 20 to 100 nm thickness and an aluminum film of 50 to 300 nm thickness are formed in sequence on the first resin film 12 and in the holes 13a, 13b, 13c by the sputter method. Subsequently to this, by patterning the third-layer metal layer by means of the photolithography method using the chlorine gas and RIE, the pixel electrode 32c is formed in the display portion A and also the third-layer wiring patterns 32a, 32b are formed in the peripheral circuit portion B. In this case, a single-layer Al film may be formed as the third-layer metal layer.

Then, respective films on the insulating substrate 1 are heated at the temperature of 200 to 300° C. in the hydrogen ($H_2$) mixed gas atmosphere or the nitrogen ($N_2$) atmosphere. Such heating process is effective for the performance improvement of the TFTs 6, 7, 8 and the characteristic stabilization of the first resin film 12.

Figure 7B:
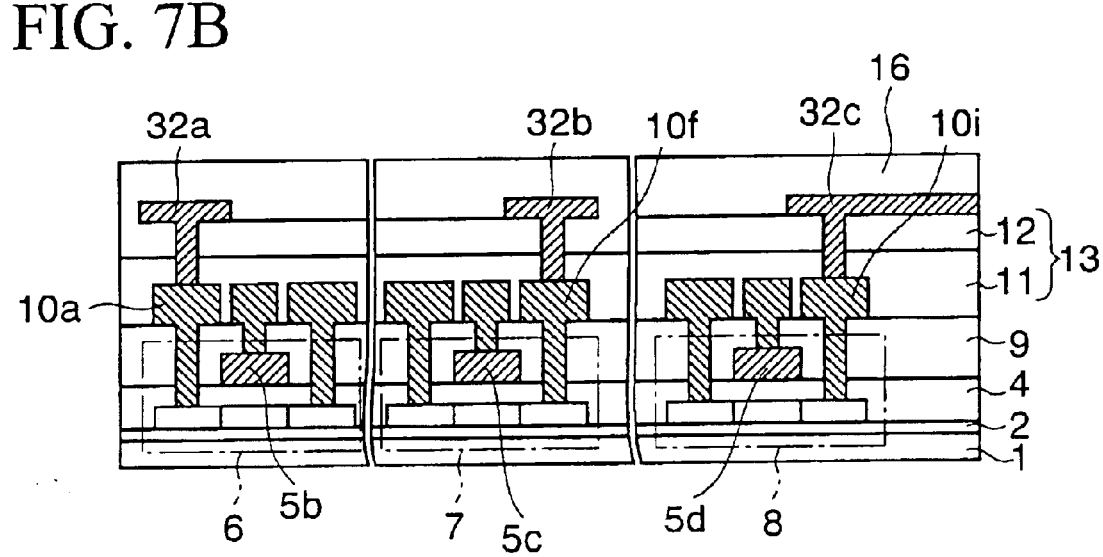

Then, as shown in FIG. 7B, the alignment film 16 is printed on the display portion A and the peripheral circuit portion B as the second resin film. The forming step of the alignment film 16 is a part of the panel step, as shown in FIG. 3. That is, in the second embodiment, the formation of the uppermost interlayer insulating film is omitted and this alignment film is used for the interlayer insulating film.

In FIGS. 10A and 10B, the same references as those depicted in FIG. 2A to FIG. 2M denote the same elements.

The planar shapes on the insulating substrate 1 on which the TFTs 6, 7, 8 and the multi-layered wiring structure are formed as mentioned above are similar to those in FIG. 4. More particularly, like the first embodiment, the transfer electrodes 17 are formed near four corners of the insulating substrate 1, and preferably the alignment film 16 for covering the peripheral circuit portion B and the display portion A should not be formed on the transfer electrodes 17 and their peripheral areas. In addition, the seal 18 is formed around the insulating substrate 1 like the frame to surround the display portion A, the peripheral circuit portion B, and the transfer electrodes 17.

Figure 8:
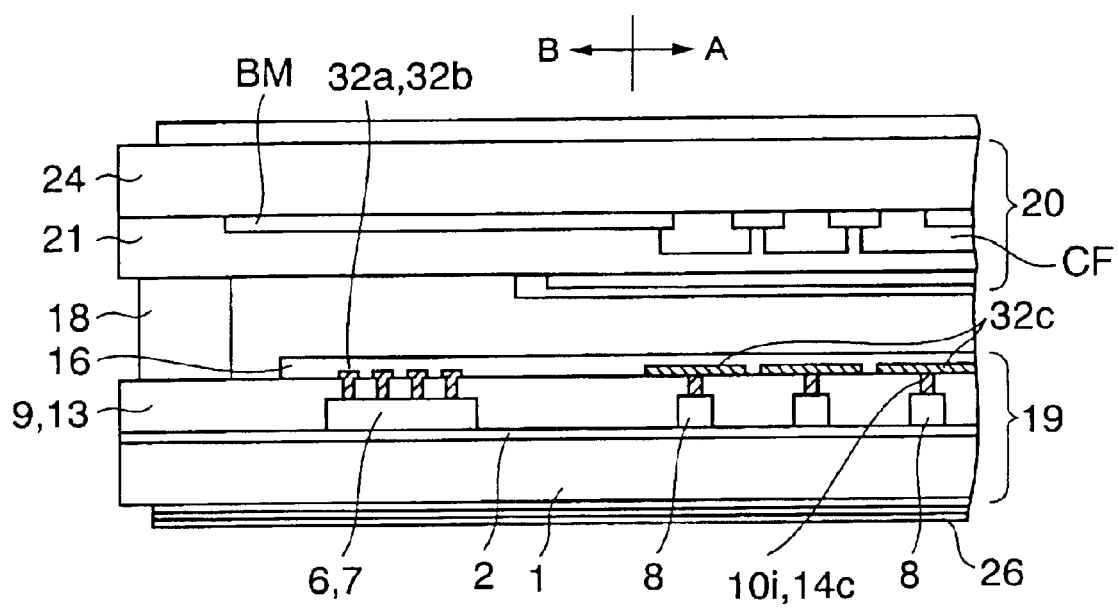
FIG. 8 is a partial sectional view showing the liquid crystal display device according to the second embodiment of the present invention.
Figure 11:
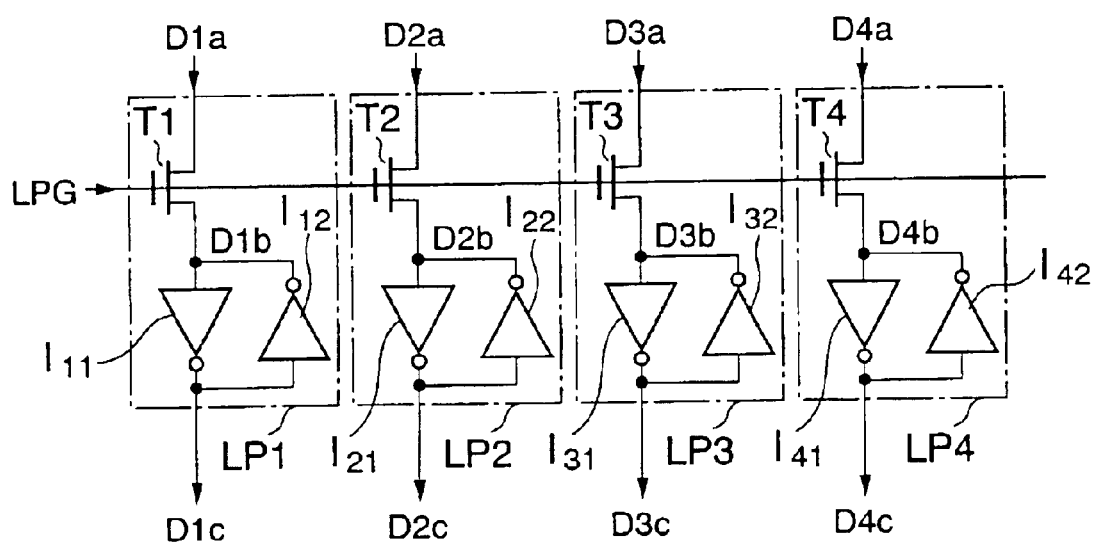
FIG. 11 is a circuit diagram showing four bits of a latch circuit of the data driver according to the third embodiment of the present invention.

The liquid crystal display device according to the second embodiment is shown in FIG. 8. In FIG. 11, the third-layer wiring patterns 32a, 32b in the peripheral circuit portion B are covered directly with the alignment film (second resin film) 16 without the intervention of the transparent conductive film. Also, the pixel electrode 32c having the reflection surface is connected to the source region 8s of the TFT 8 via the second-layer wiring pattern 14c. In the opposing substrate 20, the planarization film 21 on the color filter CF may be omitted. Also, it is desired in the opposing substrate 20 that, in order to eliminate the influence of the inclination of the liquid crystal molecules in the display portion A, the alignment film should not be formed on the portions that oppose to the peripheral circuit portion B.

Since other structures of the liquid crystal display device shown in FIG. 11 are similar to those in the first embodiment, their explanation will be omitted.

In this case, since the effects and advantages of the second embodiment are almost similar to those of the first embodiment, their explanation will be omitted.

(Third Embodiment)

In a third embodiment, as an example of the peripheral circuit which is integrated with the 0.4 type UXGA liquid crystal display panel having the display resolution of 238 dpi, a method of constructing a 8-bit digital data driver employing the structures and the processes in the first and second embodiments will be explained hereunder.

Figure 9A:
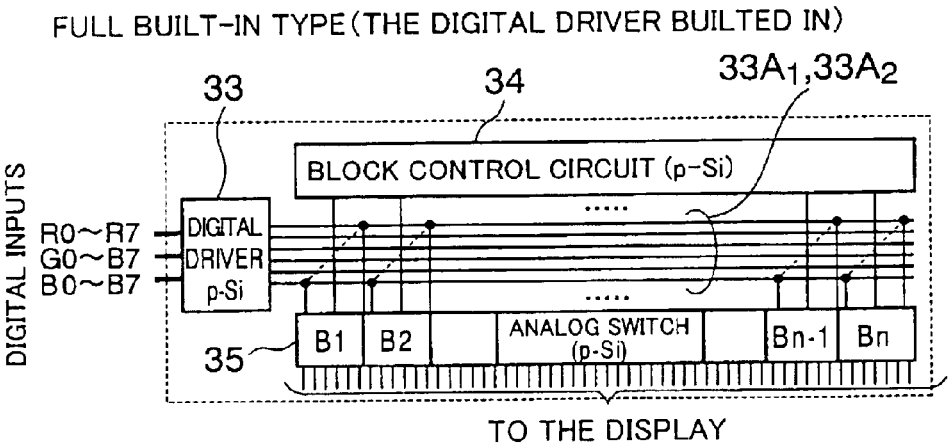
FIGS. 9A to 9C and FIG. 10 are block diagrams showing a data driver in a peripheral circuit portion of a liquid crystal display device according to a third embodiment of the present invention.
Figure 9B:
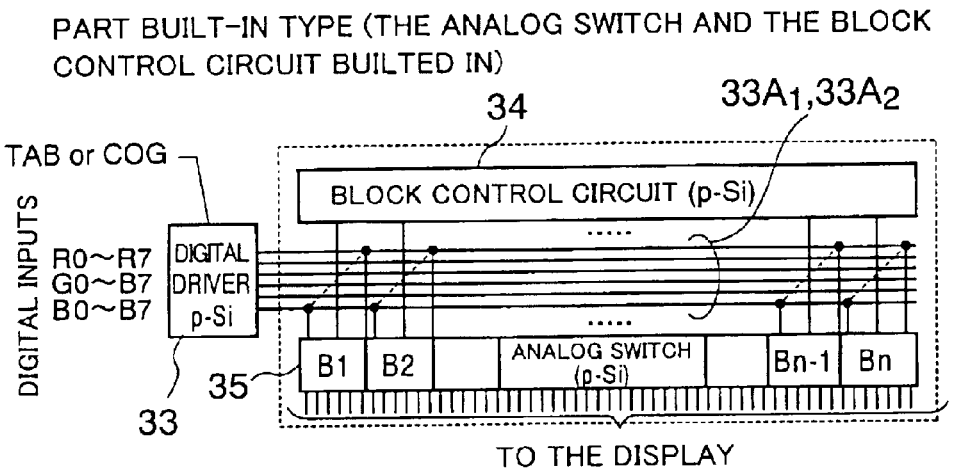
Figure 9C:
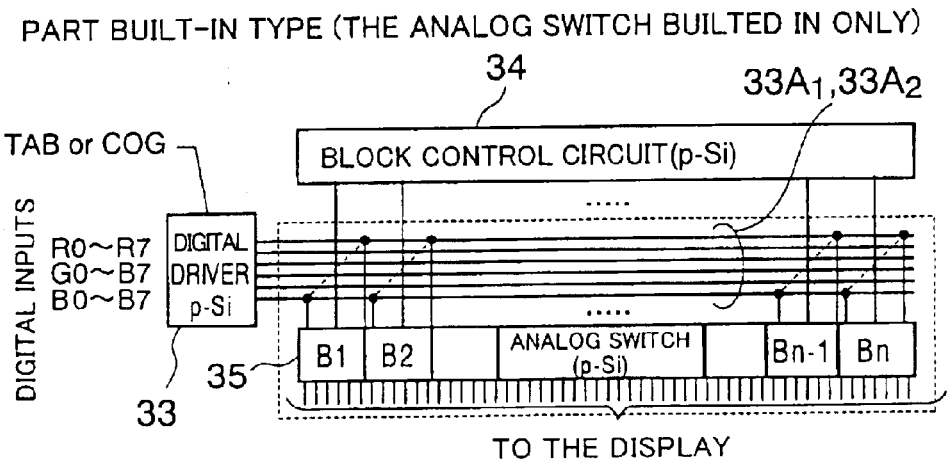

FIGS. 9A to 9C show three-type data drivers a part or all of which are integrated with the liquid crystal display device employing the low-temperature polysilicon TFTs. The data driver constitutes the data side peripheral circuit 30b in FIG. 6, and has a circuit configuration that converts the digital video signal input from the input terminal into the analog tone signal and feeds predetermined timing data to the display portion A. In FIGS. 9A to 9C, 8-bit digital input RGB signals are input into a digital driver 33 on the TFT substrate 19. The RGB signals are 24-channels of R0 to R7, G0 to G7, and B0 to B7.

A first-type data driver shown in FIG. 9A is a perfect built-in type that the digital driver 33, a block control circuit 34, an analog switch series 35, all being surrounded by a broken line, are built in the TFT substrate 19 in FIG. 5 or FIG. 11.

A second-type data driver shown in FIG. 9B is a partial built-in type that the block control circuit 34 and the analog switch series 35, both being surrounded by a broken line, are built in the TFT substrate 19 in FIG. 5 or FIG. 11. Then, the digital driver 33 is a device that is formed on a single crystal semiconductor substrate and is packaged on the TFT substrate 19 via TAB packaging or COG packaging.

A third-type data driver shown in FIG. 9C is a partial built-in type that only the analog switch series 35 that is surrounded by a broken line is built in. The digital driver 33 having a D/A converting function is formed on the single crystal semiconductor substrate and is packaged on the TFT substrate 19 via TAB packaging or COG packaging. The block control circuit 34 consists of an externally-fitted printed board (PT board) circuit.

In FIGS. 9A to 9C, references $33A_1$, $33A_2$ are common signal lines that are formed on the TFT substrate 19 and are connected to an output side of the digital driver 33 and an input side of the analog switch series 35.

Since the first-type shown in FIG. 9A out of such three-type data drivers has the high integration scale, a configuration of the first-type will be examined hereunder. In this case, the TFTs 6, 7, etc. in the peripheral circuit portion B in the first and second embodiments are applied as the TFTs constituting the data driver.

Figure 10:
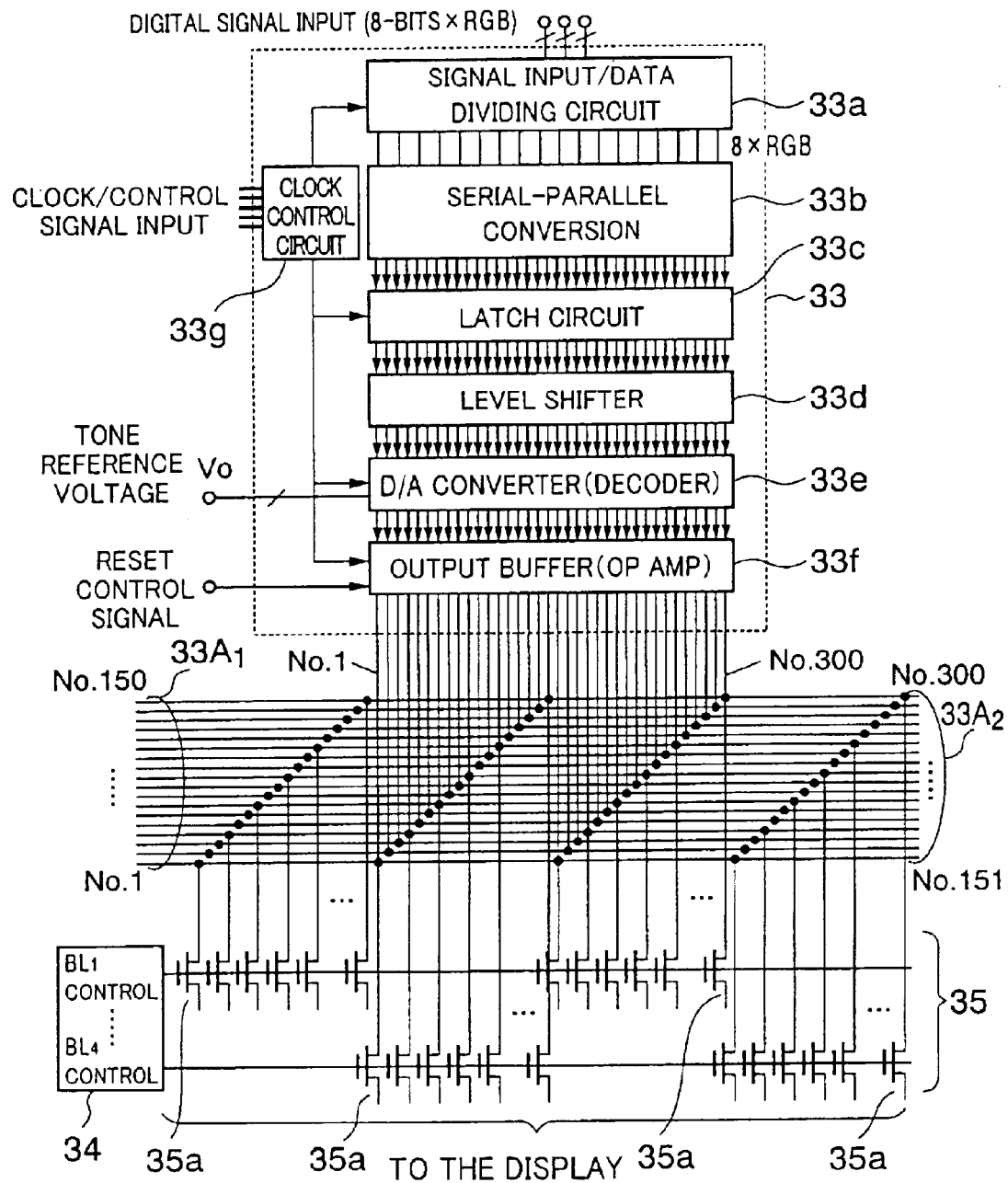

FIG. 10 is a view showing configurations of the digital driver 33, the block control circuit 34, and the analog switch portion 35, all being incorporated onto the TFT substrate 19.

The digital driver 33 having an operation frequency of 40 MHz shown in FIG. 10 comprises circuits of a signal input/data dividing circuit 33a, a serial-parallel converting portion 33b, a latch circuit 33c, a level shifter 33d, a D/A converter (decoder) 33e, an analog output buffer (OP amplifier) 33f, a clock control circuit 33g, etc.

In the data side peripheral circuit 30b, in order to lower the operation frequency of the digital driver 33 and reduce the electromagnetic interference (EMI), four input ports are provided in parallel and also the one-system digital driver 33 is provided every input port. That is, four-system digital drivers 33 are constructed in the data side peripheral circuit 30b.

Next, basic operational principles and configurations of respective portions of the digital drivers 33 will be explained hereunder.

The serial signal of 8×RGB=24 channel is converted into the parallel signal of 300 lines by the serial-parallel converting portion 33b and then transferred to the latch circuit 33c. The latch circuit 33c holds temporarily the signal and transmits this signal to the level shifter 33d and the D/A converter 33e at predetermined timings. The level shifter 33d converts the logic level (3 to 5 V) into the liquid crystal driving voltage level (10 to 15 V). The D/A converter 33e generates 256 tone signals from the reference voltage V0 and converts the digital tone code into the voltage corresponding to the tone (selected from 256 tones). The signal decoded by the D/A converter 33e is output to the panel side from the analog output buffer 33f at a predetermined timing.

The 4800 sub-pixel cells that are aligned horizontally are divided into four blocks in timing. In other words, the four-system digital drivers 33 four times output simultaneously the tone signals of 300 lines in the horizontal period. The number of loading lines per once is 1200 (4800/4) and the loading time is about ¼ horizontal period (¼ H).

Also, 300 video signal lines No.1-No.300 and 1200×4 sets analog switches 35a are formed on the output side of the digital drivers 33. The analog switches 35a are selected in unit of 1200 sets based on the block control lines BL1 to BL4 fed from the block control circuit portion 34, and thus the output signals of the digital drivers 33 are loaded into the predetermined display portion A. In this manner, the input display signals are transferred sequentially to the display portion A in order of block by the digital drivers 33 and the block control circuit 34, and then converted into the video, which can be perceived by the human being, according to the T-V characteristic of the liquid crystal.

Since the operation frequency of the polysilicon digital driver is lower than the operation frequency of the digital driver on the semiconductor LSI, the input data must be converted into the optimum transfer rate (frequency) in response to the TFT performance. Because the mobility of the low-temperature polysilicon TFTs 6 to 8 is less than 150 cm$^2$/Vs, the operational margin of the TFTs becomes wide if the clock frequency is set lower than 80 MHz.

FIG. 11 is a four-bit equivalent circuit diagram showing the latch circuit 33c. The latch circuit 33c is a line memory circuit that is positioned between the serial-parallel converting portion 33b and the level shifter 33d and saves temporarily the input digital signals D1a to D4a. The four-bit input digital signals D1a to D4a are stored in the latch cell circuits LP1 to LP4 in response to the LPG signal.

One-bit latch cell circuit LP1 (LP2, LP3, LP4) consists of one thin film transistor $T_1$ ($T_2$, $T_3$, $T_4$) and two inverters $I_{11}$, $I_{12}$ ($I_{21}$, $I_{22}$, $I_{31}$, $I_{32}$, $I_{41}$, $I_{42}$). In order to save the 8-bit digital signal, 8 identical latch cell circuits are needed per one output. Accordingly, the 300 output signals are output from one-system digital driver 33, 8×300=2400 latch cell circuits are needed. In FIG. 11, four-bit latch cell circuits LP1 to LP4 are depicted.

Figure 12:
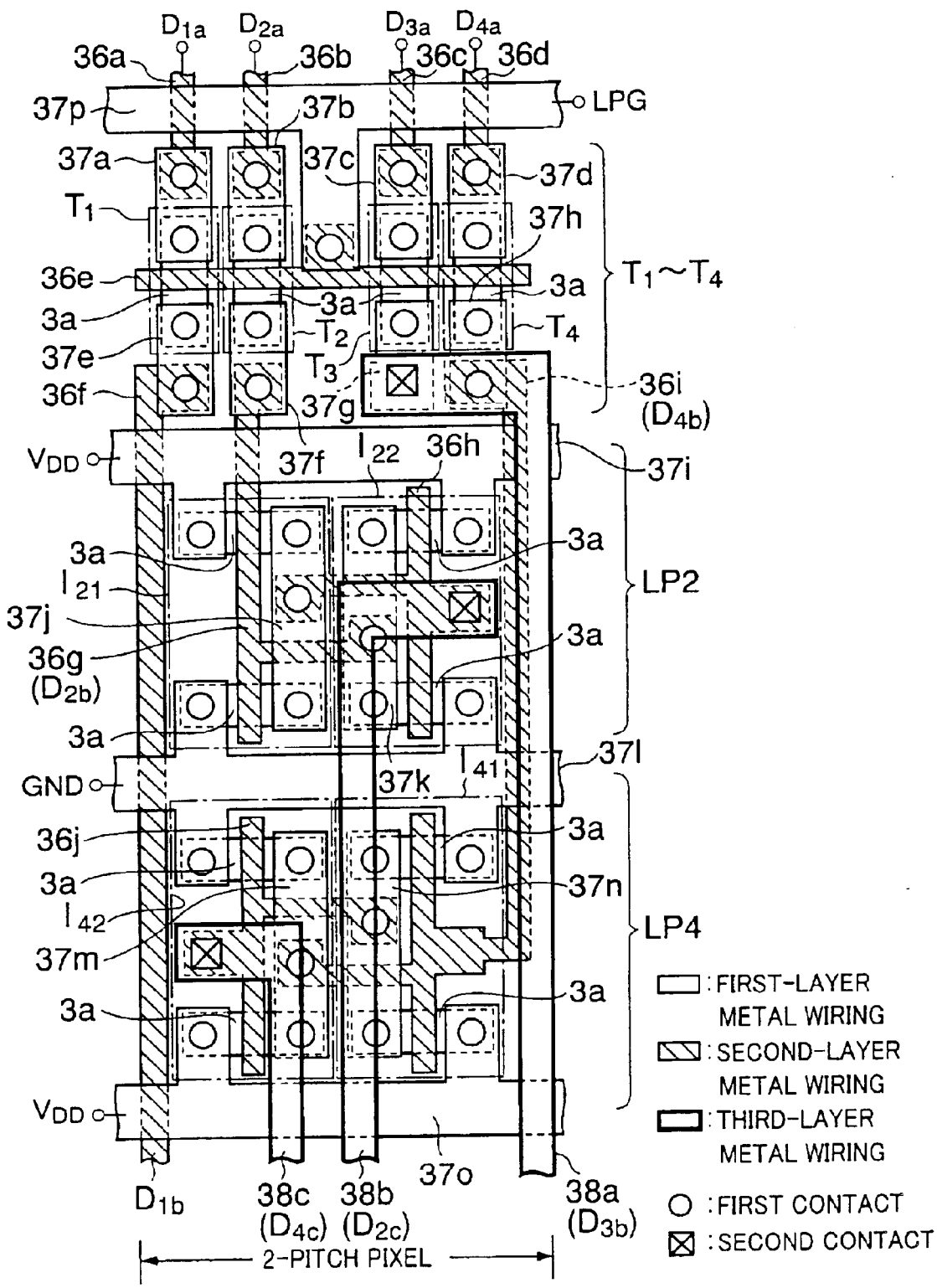
FIG. 12 is a circuit layout showing two bits of the latch circuit of the data driver according to the third embodiment of the present invention.

FIG. 12 is a two-bit layout diagram of the latch circuit 33c. The layout diagram of the transistors T1 to T4 and the latch cell circuits LP2, LP4 shown in FIG. 11 is given.

The design rule used in the layout design is 3 to 4 μm. The 8-bit latch circuit (only 2-bits are depicted in FIG. 12) can be installed into a 71 μm width of the 2-pitch pixel portion at a pixel pitch of 35.5 μm of the 8.4 type UXGA panel having the display definition of 238 dpi.

In FIG. 12, the insulating substrate 1, the underlying insulating film 2, the gate insulating film 4, and other insulating films shown in the first and second embodiments are omitted.

In FIG. 12, references 36a to 36j denote the first-layer metal wiring respectively, and the first-layer metal wirings 36e, 36g, 36h, 36i, 36j formed on the island-like silicon film 3a are also used as the gate electrode of the thin film transistor. Also, references 37a to 37p denote the second-layer metal wirings formed on the first interlayer insulating film 9 for covering the first-layer metal wirings 36a to 36j. For example, there are connection wirings 37a to 37h, 37j, 37k, 37m, 37n for connecting the island-like silicon layer 3a and the first-layer metal wirings 36a to 36j, an LPG wiring 37p for transmitting a signal LPG, constant voltage wirings 37i, 37o for applying a constant voltage $V_{DD}$ to a part of the inverters $I_{21}$, $I_{41}$, $I_{42}$, a ground potential wiring 37l for setting a part of the inverters $I_{21}$, $I_{41}$, $I_{42}$ to a ground potential GND, etc.

Then, references 38a to 38c denote the third-layer metal wirings that are formed on the second interlayer insulating film 13 to cover the second-layer metal wirings 37a to 37p. As the third-layer metal wirings 38a to 38c, for example, a wiring 38a connected to the second-layer metal wiring 37g on the drain region of the thin film transistor $T_3$ of the third latch cell circuit LP3 and extracted to the third latch cell circuit LP3, an output wiring 38b connected to the first-layer metal wiring 36h of the second latch cell circuit LP2, and an output wiring 38c connected to the first-layer metal wiring 36j of the fourth latch cell circuit LP4.

In FIG. 12, the holes for connecting the first-layer metal wirings 36a to 36j and the second-layer metal wirings 37a to 37f, 37h, 37j, 37k, 37p and connecting the island-like silicon layer 3a and the second-layer metal wirings 37a to 37o are shown as the first contact. Also, the hole formed in the second interlayer insulating film 13 to connect the third-layer metal wiring 38a and the second-layer metal wiring 37g and the hole formed in the second interlayer insulating film 13 and the first interlayer insulating film 9 to connect the third-layer metal wiring 38b and the first-layer metal wirings 36j, 36h are set forth as the second contact.

In this case, the first-layer metal wirings are the first-layer wiring patterns of the peripheral circuit portion B in the first and second embodiments, the second-layer metal wirings are the second-layer wiring patterns of the peripheral circuit portion B in the first and second embodiments, and the third-layer metal wirings are the third-layer wiring patterns of the peripheral circuit portion B in the first and second embodiments.

As described above, since the triple-layered metal wirings are employed, the high definition digital driver of more than 200 dpi, which is difficult for the double-layered metal wirings in the prior art, can be built in.

Also, since a film thickness of the first resin film 12 as the upper portion of the second interlayer insulating film 13 is thick and the relative dielectric constant thereof is small, the parasitic capacitances between the third-layer metal wirings 38a to 38c and the underlying other metal wirings 37a to 37o, 36a to 36j become small. Therefore, the high-speed operation at the high frequency such as 40 MHz can be achieved.

In addition, the large scale peripheral circuit can be fabricated by using the loose design rule such as 3 to 4 μm.
(Fourth Embodiment)

In the first embodiment, patternings of the third-layer metal layers and the transparent conductive film are carried out separately. In a fourth embodiment, the simplification to execute these patterns simultaneously will be explained hereunder.

First, like the steps shown in FIG. 2A to FIG. 2I, the TFTs 6 to 8 are formed on the insulating substrate 1, and then the first interlayer insulating film 9 and the second-layer wiring patterns 10a to 10i are formed. These steps are similar to those in the first embodiment, and thus their explanation will be omitted. However, in the fourth embodiment, as the second-layer wiring patterns 10a to 10i, the double-layered structure in which a Ti film of 50 nm thickness and an aluminum film of 200 nm thickness are formed sequentially is employed, otherwise the single layer structure or the multi-layered structure made of molybdenum (Mo), titanium, aluminum alloy, etc. is formed.

Figure 13A:
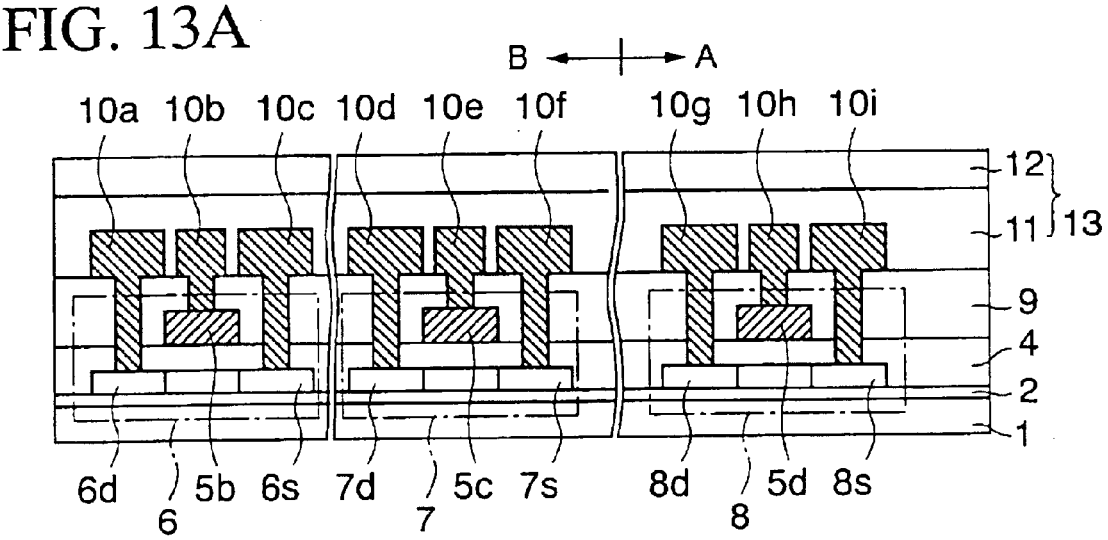
FIGS. 13A to 13K are sectional views showing steps of manufacturing a TFT substrate of a liquid crystal display device according to a fourth embodiment of the present invention.

Then, as shown in FIG. 13A, the silicon nitride film 11 for covering the second-layer wiring patterns 10a to 10i is formed on the first interlayer insulating film 9 by the PECVD method to have a thickness of 50 to 200 nm, preferably 100 nm. In addition, the first resin film 12 such as photosensitive negative-type polyimide resin, acrylic resin, etc. is formed on the silicon nitride film 11. It is preferable that the first resin film 12 should have a film thickness of more than 3 to 4 µm to achieve the planarization of the surface. The first resin film 12 and the underlying silicon nitride film 11 constitute the second interlayer insulating film 13. In this case, an inorganic film formed of SiO2, SiNx, etc. and having a thickness of more than 1 µm may be formed in place of the first resin film 12.

Figure 13B:
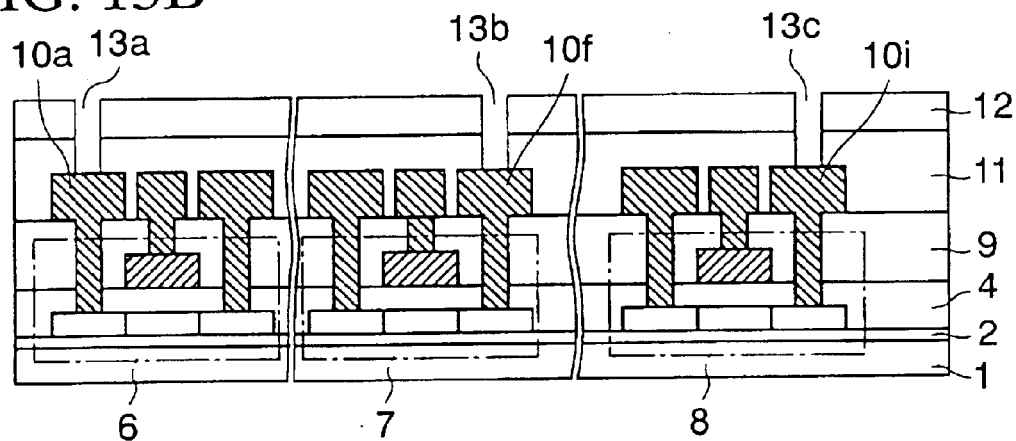

Then, as shown in FIG. 13B, the second-stage holes 13a to 13c are formed on the second-layer wiring patterns 10a to 10i by exposing/developing the first resin film 12. That is, the hole 13c is formed on the second-layer wiring pattern 10i that is electrically connected to the source region 8s of the TFT 8 in the display portion A. In addition, the silicon nitride film 11 under the first resin film 12 is etched through the holes 13a to 13c in the first resin film 12. In this case, in order to control the etching rate of the silicon nitride film 11 to the first resin film 12, a ratio of $CF_4$, $SF_6$, and $O_2$ that are employed as the etching gas of the silicon nitride film 11 is adjusted.

Figure 13C:
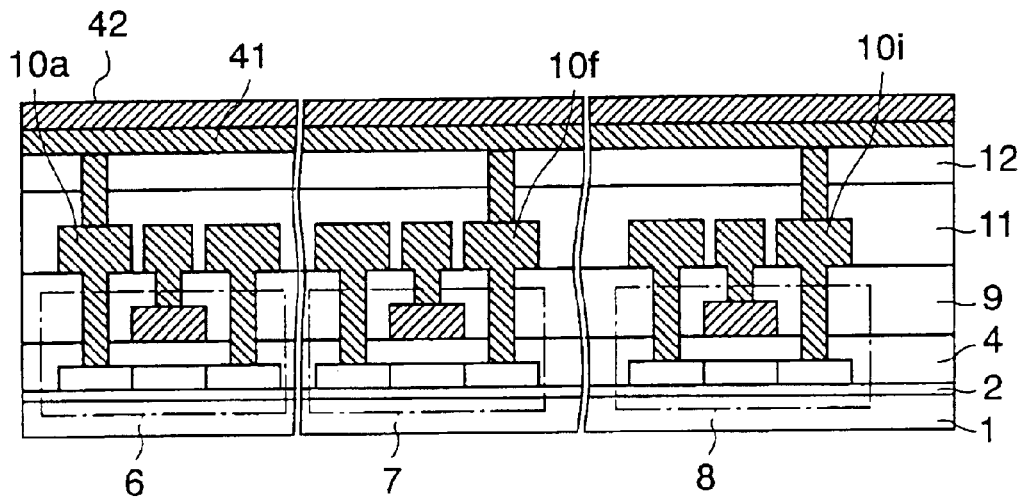

Then, as shown in FIG. 13C, an ITO film (transparent conductive film) 41 of 70 nm thickness, a titanium film of 50 nm thickness, an aluminum film of 200 nm thickness are formed successively on the second interlayer insulating film 13 and in the holes 13a to 13c by the sputter method. The Ti film and the Al film constitute the third-layer metal layer 42. The Ti film is formed as an intermediate metal blocking film to prevent the electrolytic corrosion due to the direct contact between the ITO film 41 and the Al film. In this case, a molybdenum film may be formed as the intermediate metal blocking film.

Figure 13D:
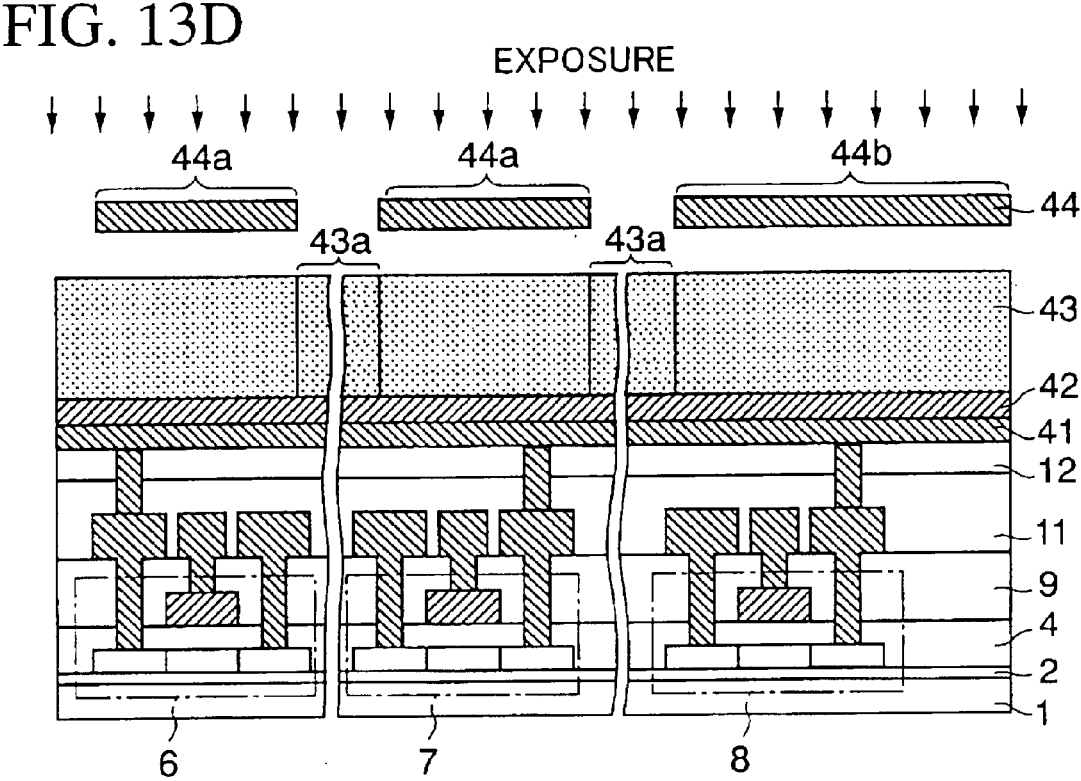

Next, a positive-type photoresist 43 is coated on the third-layer metal layer 42 to have a thickness of 3 µm. Then, as shown in FIG. 13D, the photoresist 43 containing the display portion A and the peripheral circuit portion B is exposed by a normal exposure light amount. At the time of the first exposure, a first reticle (exposure mask) 44 having light-shielding patterns 44a like a wiring shape and a light-shielding pattern 44b like a pixel shape is used.

Light-irradiated regions 43a are formed in the photoresist 43 by such first exposure.

Then, the step is shifted to the second exposing step of the photoresist 43 without the development of the photoresist 43.

Figure 13E:
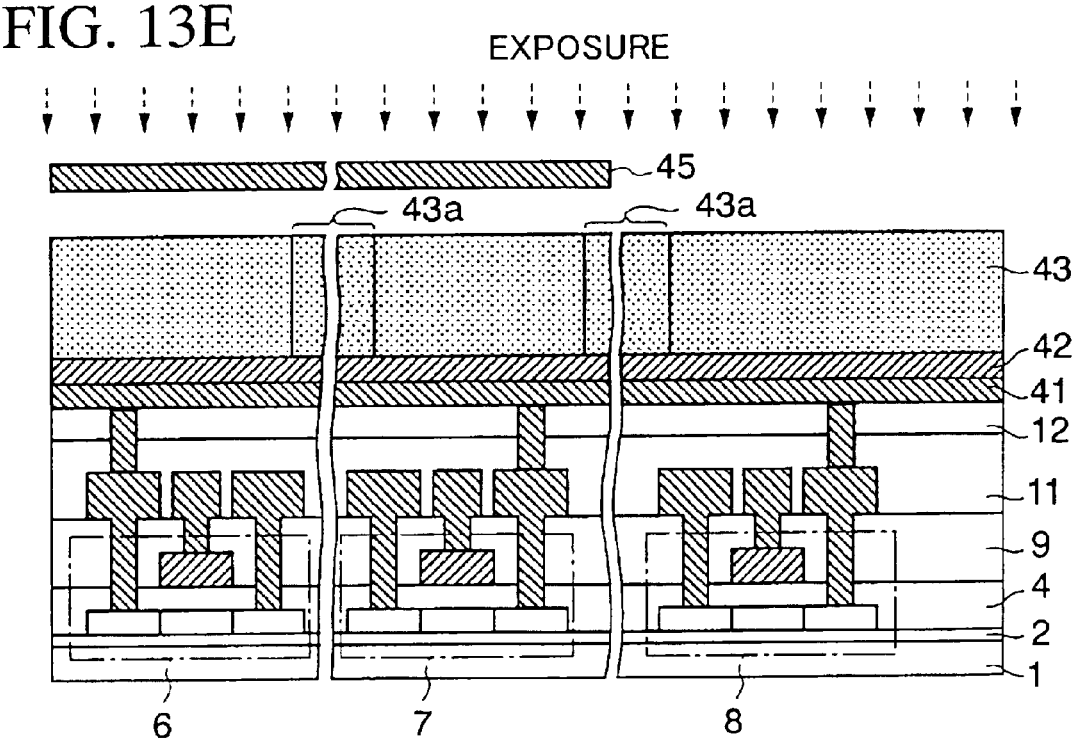

At the time of the second exposure, as shown in FIG. 13E, a second reticle (exposure mask) 45 having a transmission pattern for transmitting the exposure light to at least the pixel region of the display portion A and a light-shielding pattern for shielding the overall peripheral circuit portion B from the light is used. Also, an exposure light amount at the time of the second exposure is set to ⅓ to ⅔ of the exposure light amount at the time of the first exposure. Accordingly, the pixel regions onto which the light is not irradiated at the time of the first exposure are half-exposed.

As a result, the photoresist 43 in the pixel regions is the half-exposed portion, and the photoresist 43 in other wiring pattern portions is not exposed. In addition, the exposure light has already been irradiated to the photoresist 43 in the portions, in which the third-layer metal layer 42 and the ITO film are not left, by the normal light amount.

Figure 13F:
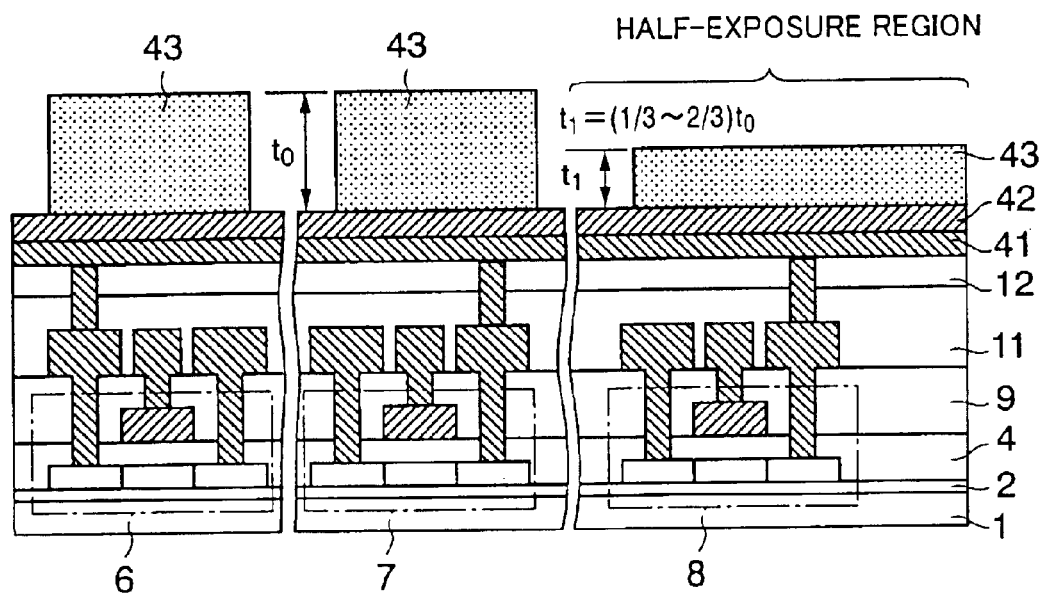

After this, the photoresist 43 is developed. Thus, as shown in FIG. 13F, the photoresist 43 in the peripheral circuit portion B has the thickness $t_1$ same as that obtained via the normal single exposure, whereas the thickness $t_2$ of the photoresist 43 in the pixel region in the display portion A is reduced to about ⅓ to ⅔ in contrast to the photoresist 43 in the peripheral circuit portion B.

Figure 13G:
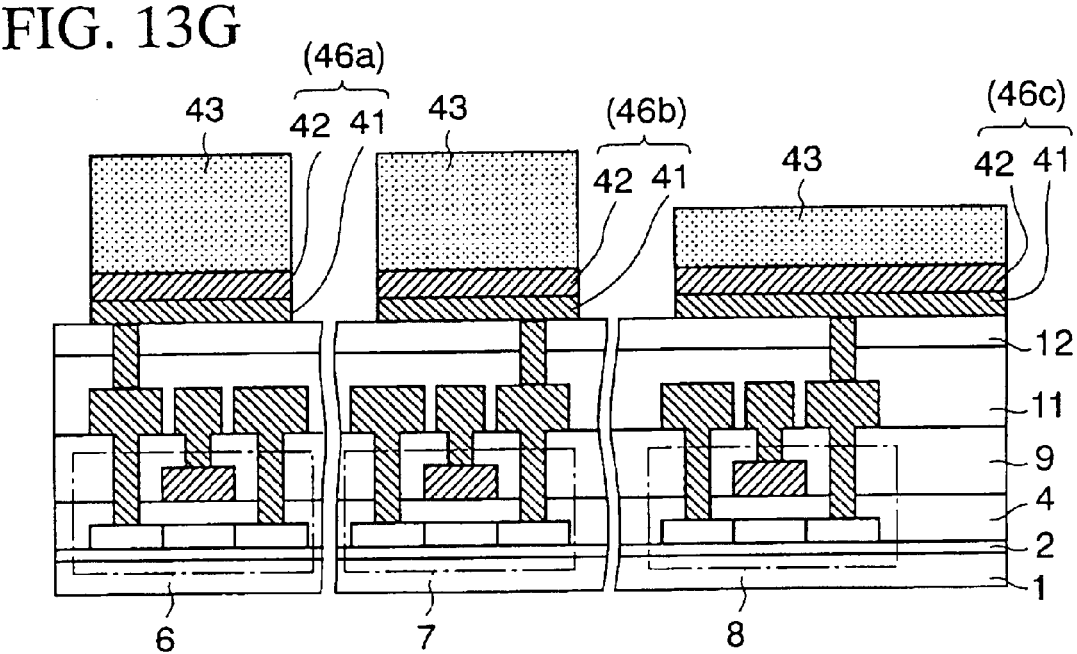

Then, the third-layer metal layer 42 and the transparent conductive film 41 are etched sequentially by using the patterns of the photoresist 43 having such film thickness distribution as a mask. Thus, as shown in FIG. 13G, third-layer wiring patterns 46a, 46b consisting of the metal layer 42 and the ITO film 41 are formed in the peripheral circuit portion B, and a pixel electrode 46c consisting of the ITO film 41 is formed in the display portion A.

Figure 13H:
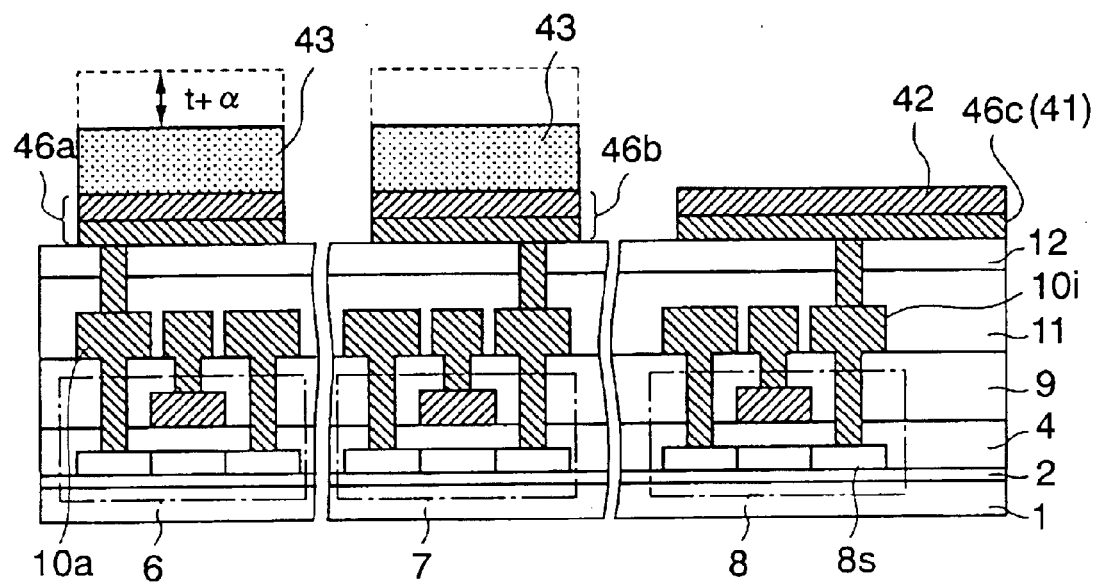

Then, as shown in FIG. 13H, the oxygen ashing is carried out under the condition that the photoresist 43 on the pixel electrode 46c can be eliminated but the photoresist 43 can be left in the peripheral circuit portion B. As a method of adjusting a film thickness of the photoresist 43, the end point of the etching is decided by detecting the carbon (C) in the plasma generated in the ashing and then monitoring its signal intensity. The care not to cause the excessive over-ashing must be taken. If the film thickness of the photoresist 43 left on the pixel electrode 46c after the third-layer metal layer 42 is etched is assumed as t, the film thickness of the photoresist 43 in the peripheral circuit portion B is reduced by about t+α. Where α is a thickness that is reduced by the over-ashing.

In this state, the third-layer wiring patterns 46a, 46b in the peripheral circuit portion B are covered with the photoresist 43 and the third-layer metal layer 42 left in the display portion A is exposed.

Figure 13I:
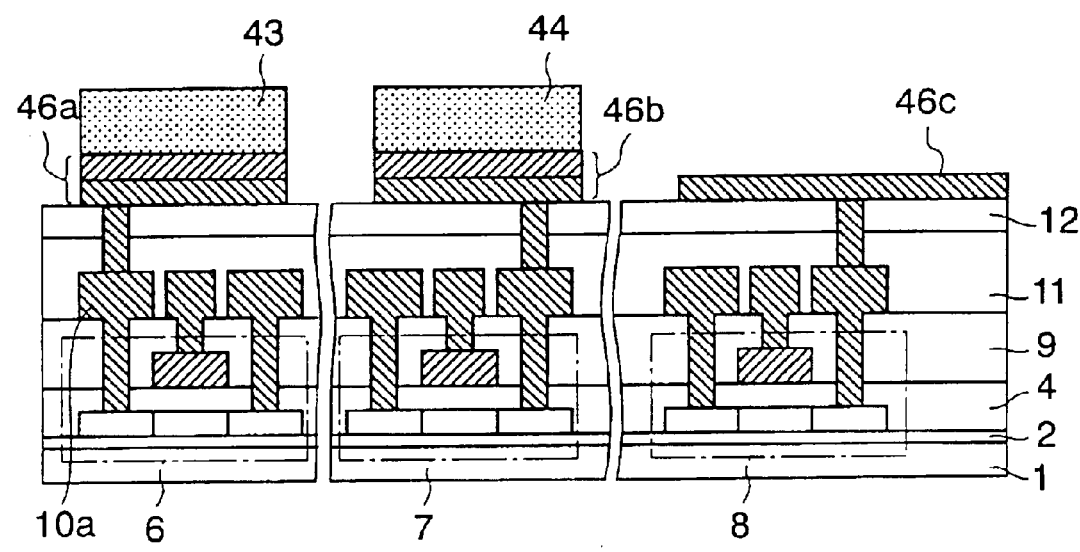

Then, as shown in FIG. 13I, the third-layer metal layer 42 on the pixel electrode 46c is removed by the etching. In this case, in order to leave the ITO film 41 constituting the pixel electrode 46c, a metal etchant having a high selective etching ratio to ITO is used. In the peripheral circuit portion B, since the third-layer metal layer 42 constituting the third-layer wiring patterns 46a, 46b is protected by the photoresist 43, and such third-layer metal layer 42 is not etched.

Figure 13J:
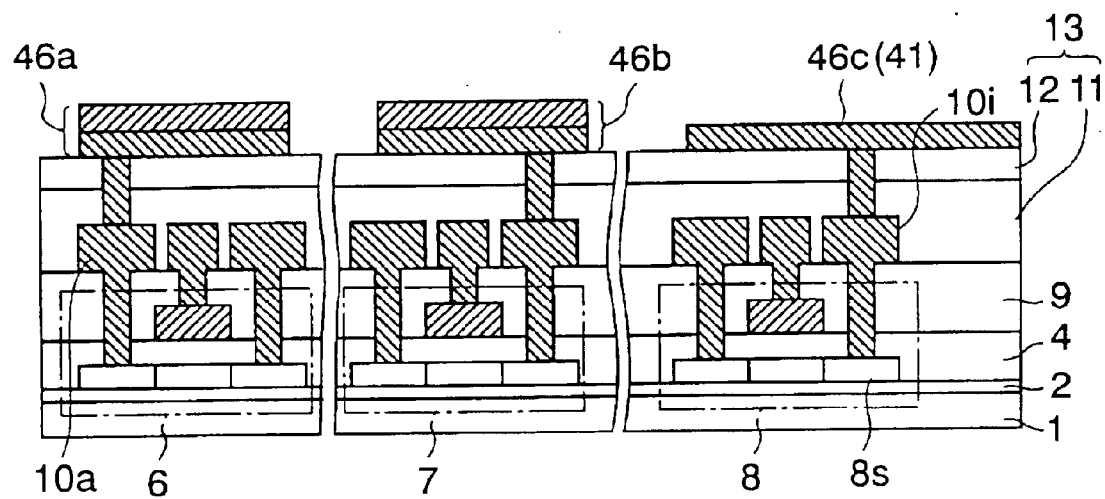

Then, as shown in FIG. 13J, the photoresist 43 is removed. If the first resin film 12 is applied as the upper layer portion of the second interlayer insulating film 13, there is the possibility that the first resin film 12 is thinned. Therefore, the film thickness of the first resin film 12 must be adjusted such that the first resin film 12 is left in ashing the photoresist 43. In this case, if the upper portion of the second interlayer insulating film 13 is formed of the inorganic film, the second interlayer insulating film 13 is never thinned by the ashing. As the second interlayer insulating film 13, a triple-layered structure in which the resin film is put between the inorganic films may be employed.

Figure 13K:
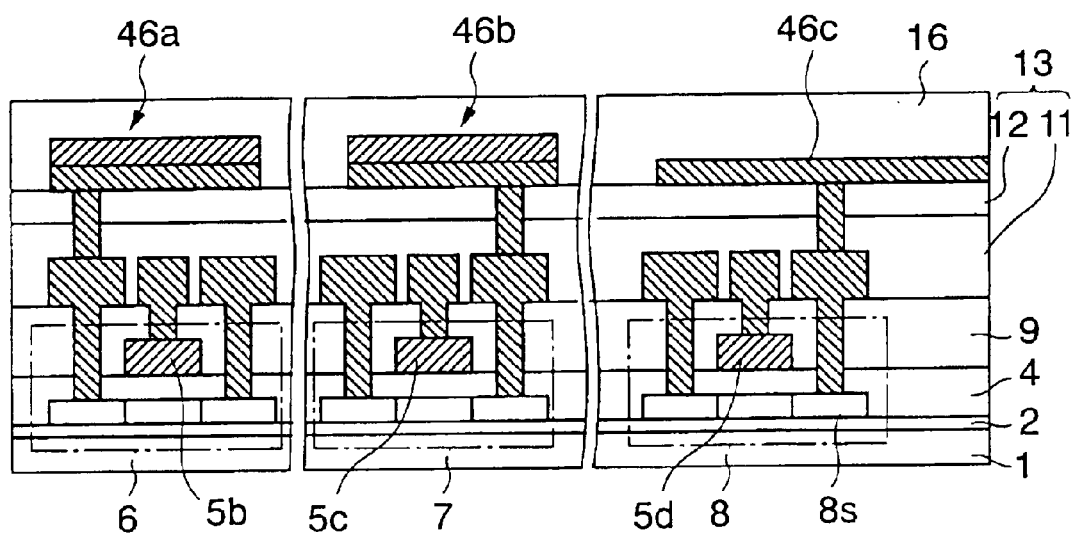

Then, as shown in FIG. 13K, the alignment film (second resin film) 16 for covering the wiring patterns 46a, 46b and the pixel electrode 46c is formed on the second interlayer insulating film 13.

As described above, according to the fourth embodiment, the pixel electrode 46c and the third-layer wiring patterns 46a, 46b in the display portion A can be formed by one photolithography step having the half-exposure step. Therefore, the manufacturing steps can be simplified and the production cost can be reduced.

(Fifth Embodiment)

In a fifth embodiment, simplification of steps by forming the above third-layer metal layer by means of the mask selection sputter method will be explained hereunder. As the mask selection sputter method, there are various methods according to the difference in forming order of the transparent conductive film and the third-layer metal layer.

Figure 14A:
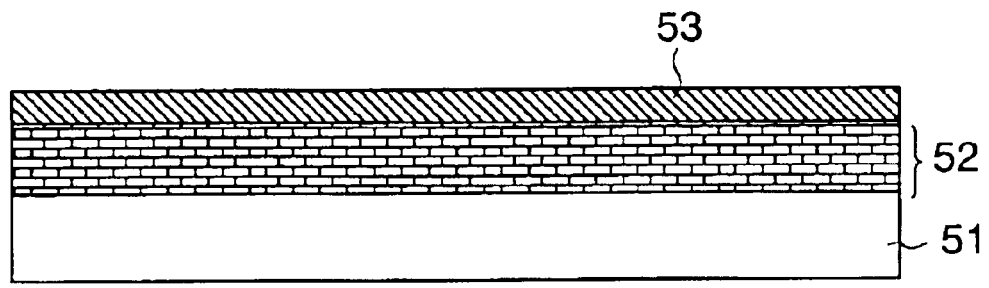
FIGS. 14A and 14B are views showing steps of a first mask selection sputter method employed in a fifth embodiment of the present invention.
Figure 14B:
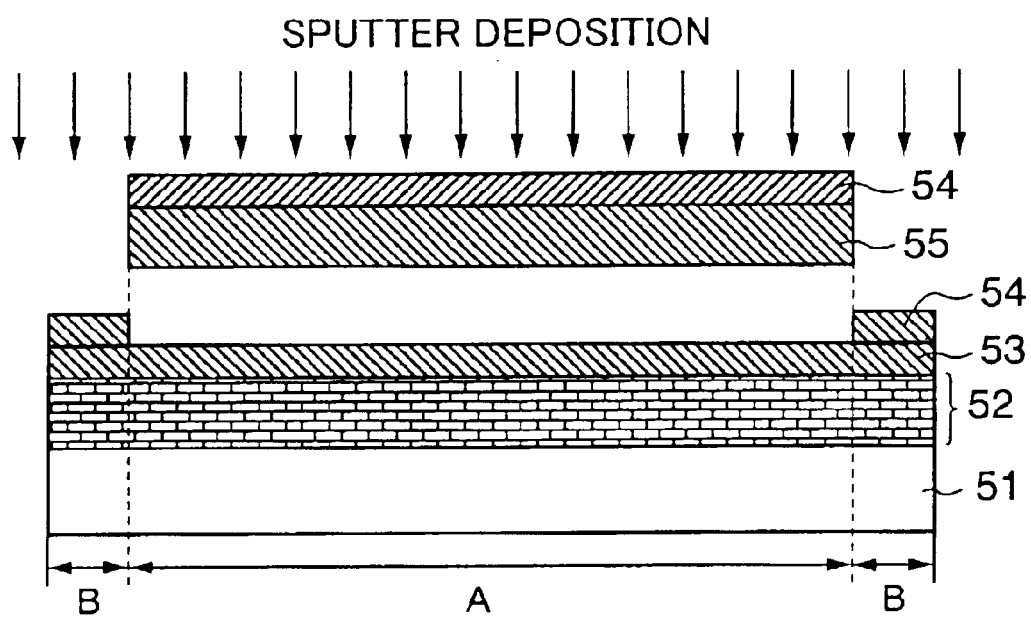

FIGS. 14A and 14B shows a first mask selection sputter method for forming the third-layer metal layer after the transparent conductive film is formed.

First, as shown in FIG. 14A, a device structure portion 52 containing TFTs, first-layer and second-layer metal layers, the interlayer insulating film, the first resin film, etc. is formed on an insulating substrate 51. The uppermost layer of the device structure portion 52 is the first resin film. Then, the ITO film 53 as the transparent conductive film is formed on the device structure portion 52 by the normal sputter method.

Then, as shown in FIG. 14B, a Ti film of 50 nm thickness and an Al film of 200 nm thickness are formed as a third-layer metal layer 54 on the ITO film 53 by the sputter in the situation that the display portion A of the device structure portion 52 is shielded from the sputter source by a sputter metal mask 55. Accordingly, the films 53, 54 having a multi-layered structure of ITO/Ti/Al are formed in the peripheral circuit portion B of the device structure portion 52, and only the single-layer ITO film 53 is formed in the display portion A.

Figure 15A:
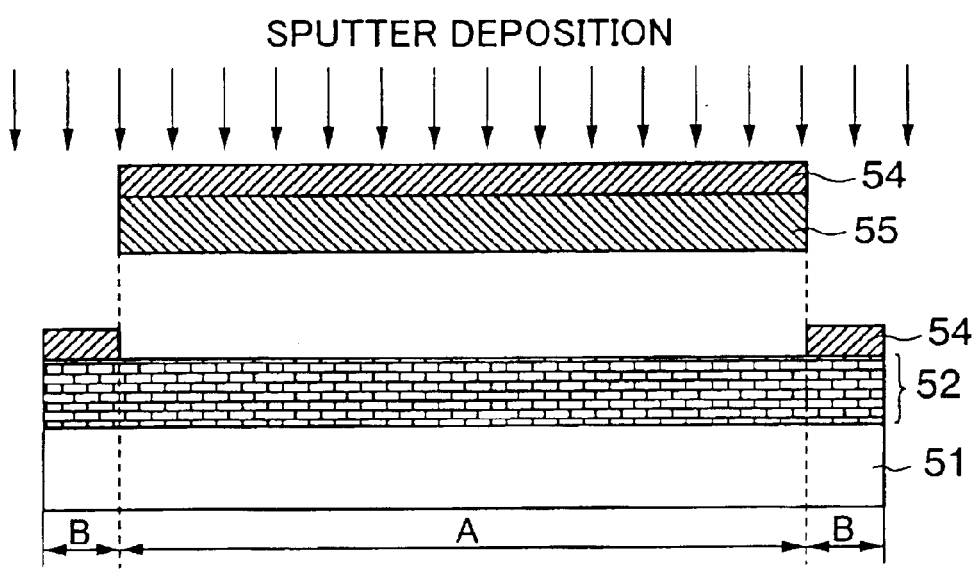
FIGS. 15A and 15B are views showing steps of a second mask selection sputter method employed in the fifth embodiment of the present invention.
Figure 15B:
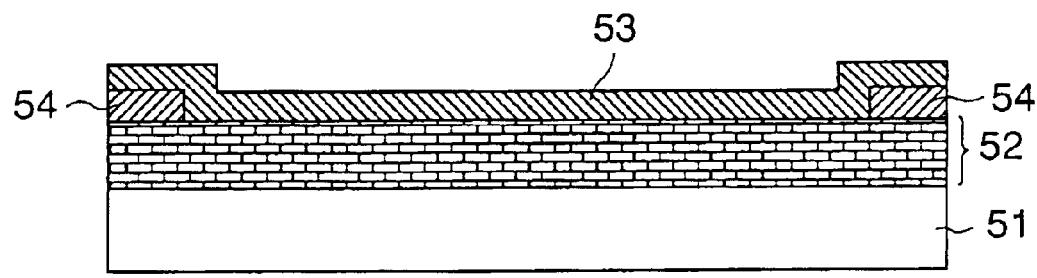

FIGS. 15A and 15B show a second mask selection sputter method for forming the transparent conductive film after the third-layer metal layer is formed.

First, as shown in FIG. 15A, the device structure portion 52 is formed on the insulating substrate 51. Then, the Ti film of 50 nm thickness and the Al film of 200 nm thickness are formed sequentially as the third-layer metal layer 54 on the first resin film of the device structure portion 52 by the sputter via the sputter metal mask 55 in the situation that the display portion A of the device structure portion 52 is shielded from the sputter source by using the sputter metal mask 55.

Then, as shown in FIG. 15B, the sputter metal mask 55 is removed from the area over the insulating substrate 51, and the ITO film is formed as the transparent conductive film 53 on the device structure portion 52 and the third-layer metal layer 54 by the normal sputter method. Accordingly, the films 53, 54 having a multi-layered structure of Ti/Al/ITO are formed in the peripheral circuit portion B, and only the single-layer transparent conductive film 53 is formed in the display portion A.

Then, steps of forming the pixel electrode and the third-layer wiring pattern by using the first mask selection sputter method shown in FIGS. 14A and 14B will be explained hereunder.

First, like the steps shown in FIG. 2A to FIG. 2H, the TFTs 6, 7, 8 are formed on the insulating substrate 1, and then the first interlayer insulating film 9 and the second-layer wiring patterns 10a to 10i are formed. Since their details are similar to the first embodiment, their explanation will be omitted. In this case, as the film of the second-layer wiring patterns 10a to 10i, the double-layered structure in which a Ti film of 50 nm thickness and an aluminum film of 200 nm thickness are formed in sequence or the single-layer or multi-layered structure such as Mo, Ti, Al alloy is formed.

Figure 16A:
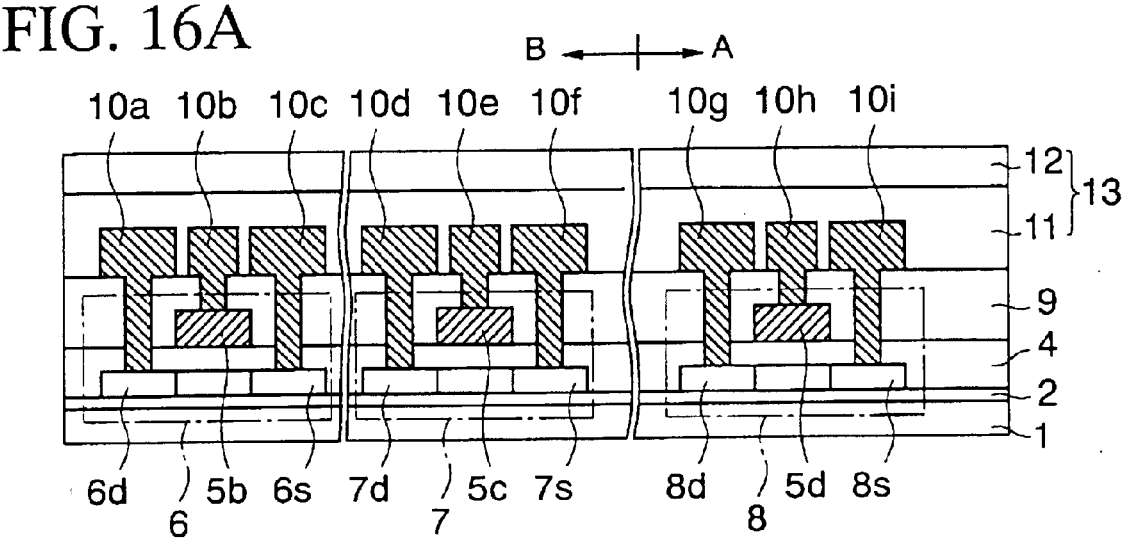
FIGS. 16A to 16H are sectional views showing steps of manufacturing a TFT substrate of a liquid crystal display device according to the fifth embodiment of the present invention.

Then, as shown in FIG. 16A, the silicon nitride film 11 for covering the second-layer wiring patterns 10a to 10i is formed on the first interlayer insulating film 9 by the PECVD method to have a thickness of 50 to 200 nm, preferably 100 nm. In addition, the first resin film 12 such as photosensitive polyimide resin, acrylic resin, etc. is formed on the silicon nitride film 11. It is preferable that the first resin film 12 should have a film thickness of more than 3 to 4 $\mu$m to planarize its surface. The first resin film 12 and the underlying silicon nitride film 11 constitute the second interlayer insulating film 13. The inorganic film formed of $SiO_2$, $SiN_x$, etc. and having a thickness of more than 1 $\mu$m may be formed in place of the first resin film 12.

Figure 16B:
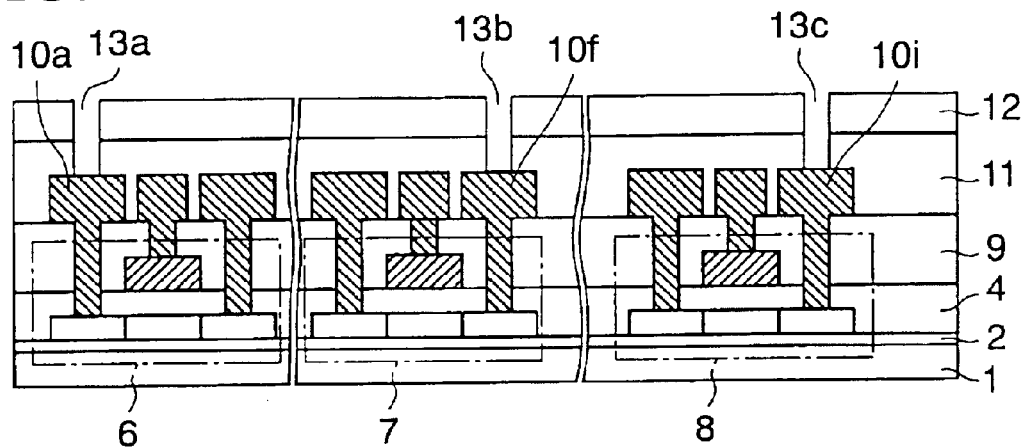

Then, as shown in FIG. 16B, the holes 13a to 13c are formed on the second-layer wiring patterns 10a to 10i by exposing/developing the first resin film 12. For example, the hole 13c is formed on the second-layer wiring pattern 10i that is electrically connected to the source region 8s of the TFT 8 in the pixel forming region. Then, the silicon nitride film 11 under the first resin film 12 is etched through the holes 13a to 13c in the first resin film 12. In this case, in order to control the etching rate of the silicon nitride film 11 to the first resin film 12, a ratio of $CF_4$, $SF_6$, and $O_2$ employed as the etching gas is adjusted.

Figure 16C:
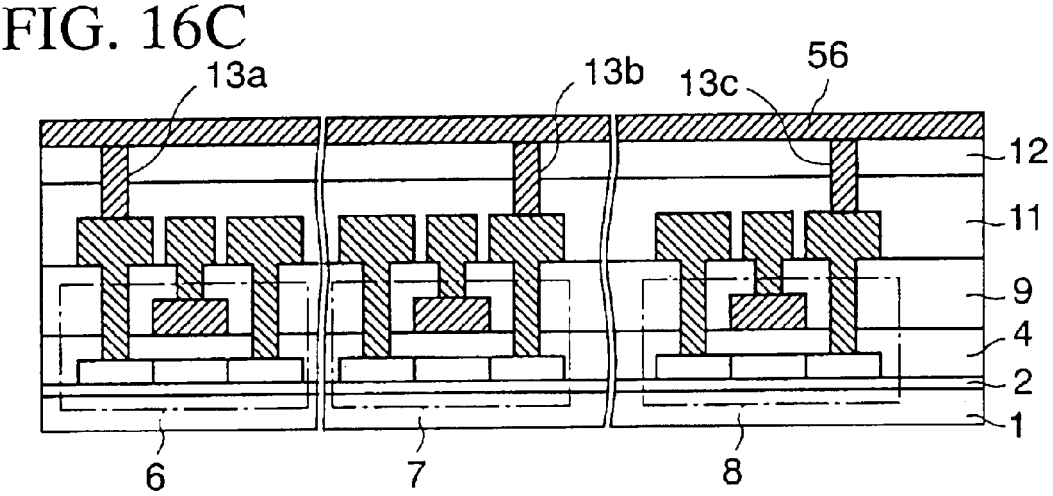

Then, as shown in FIG. 16C, the ITO film of 70 nm thickness is formed as a transparent conductive film 56 on the first resin film 12 and in the holes 13a to 13c by the sputter method.

Figure 16D:
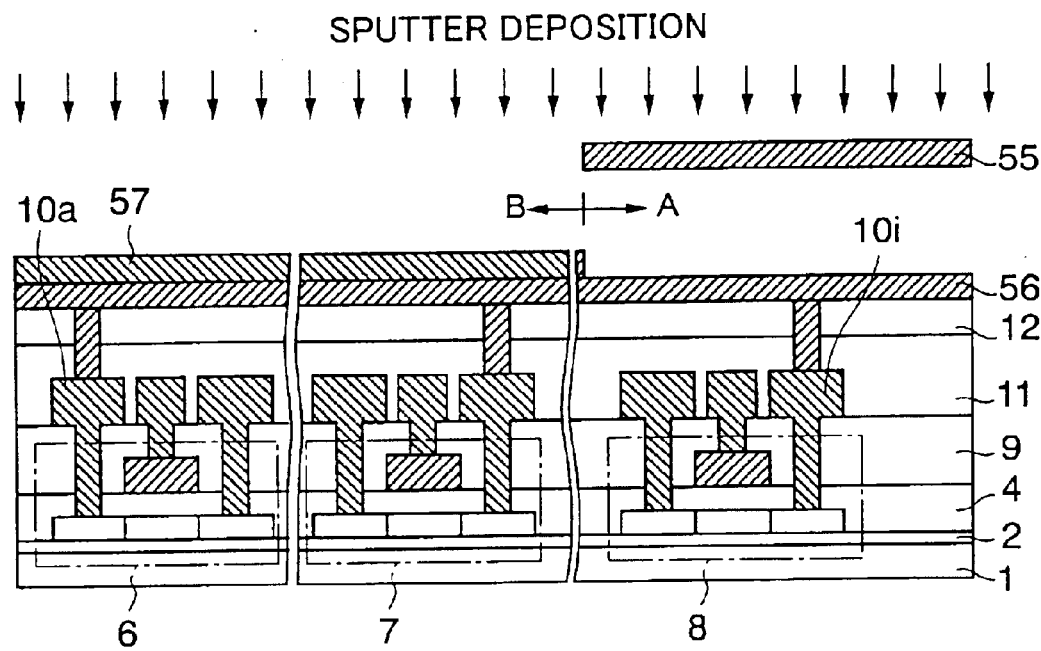

Then, as shown in FIG. 16D, while shielding the transparent conductive film 56 in the display portion A by the sputter metal mask 55, a titanium (Ti) film of 50 nm thickness and an aluminum (Al) film of 200 nm thickness are formed successively on the transparent conductive film 56 in the peripheral circuit portion B by the sputter method. The Ti film and the Al film constitute a third-layer metal layer 57. Like the fourth embodiment, the Ti film functions as the intermediate metal blocking film. In this case, molybdenum may be formed as the intermediate metal blocking film.

Figure 17:
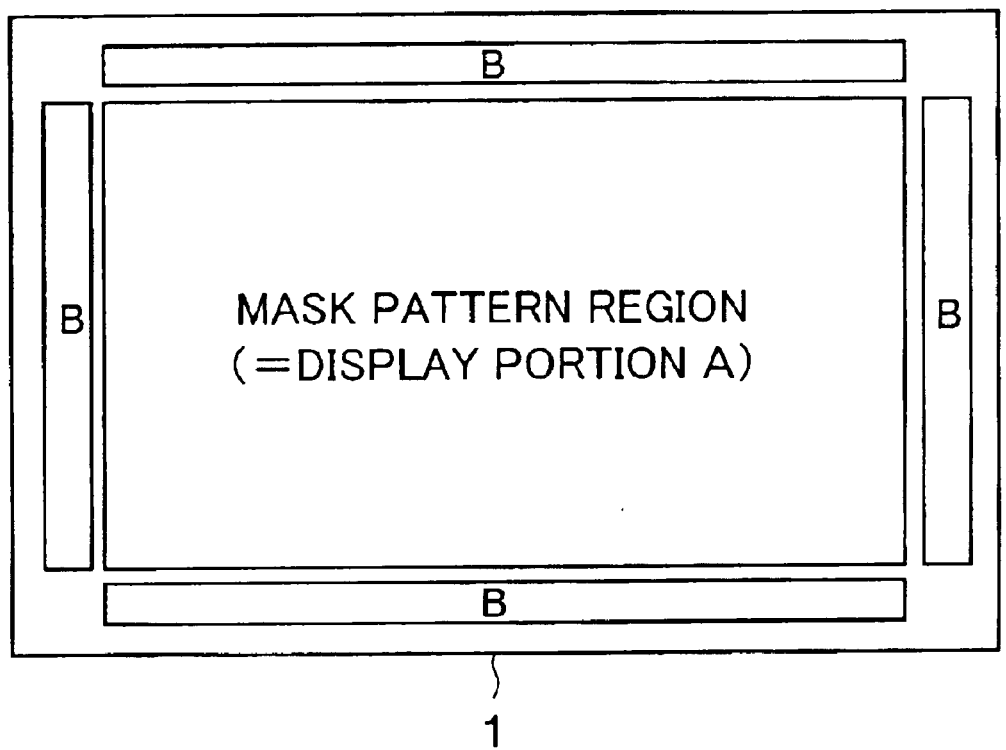
FIG. 17 is a plan view showing a third-layer metal layer employed in the fifth embodiment of the present invention.

The arrangement of the display portion A in which only the transparent conductive film 56 is formed on the insulating substrate 1 and the peripheral circuit portions B in which the third-layer metal layer 57 and the transparent conductive film 56 are formed are shown like a plan view of FIG. 17. In this case, all areas other than the display portion A may be employed as the area in which the third-layer metal layer 57 is formed.

Figure 16E:
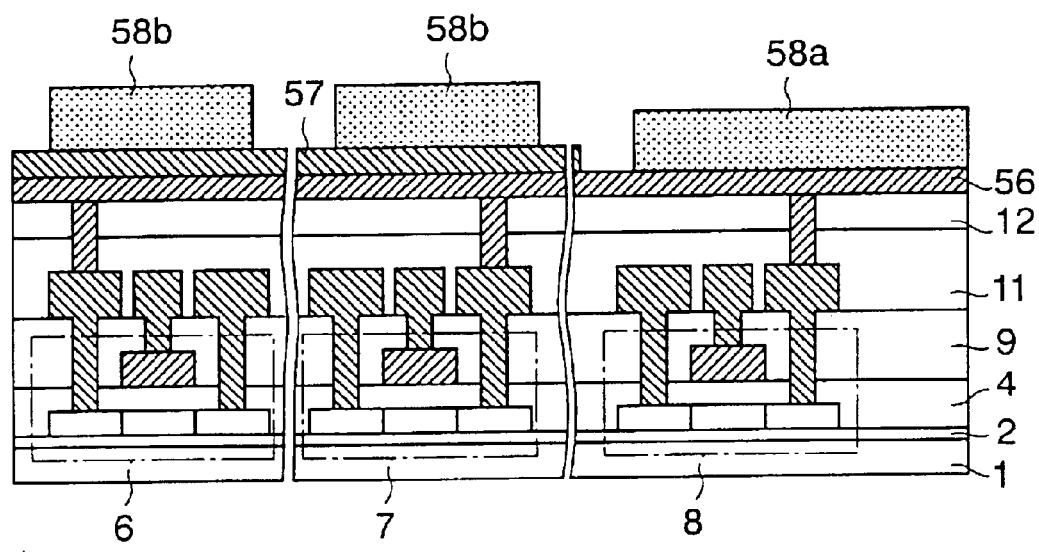

Then, the sputter metal mask 55 is removed from the area over the insulating substrate 1, and then positive-type photoresist 58 of 1.5 $\mu$m thickness is coated on the third-layer metal layer 57 and the transparent conductive film 56. Then, as shown in FIG. 16E, by exposing/developing the photoresist 58, a pixel resist pattern 58a is formed in the display portion A and wiring resist patterns 58b are formed in the peripheral circuit portion B.

Figure 16F:
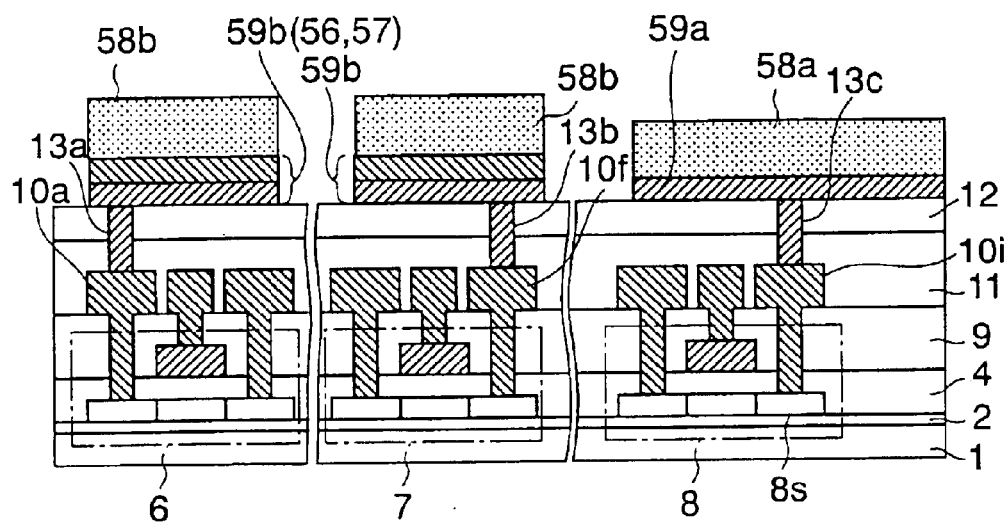

Then, while using the pixel resist pattern 58a and the wiring resist patterns 58b as a mask, the transparent conductive film 56 is etched in the display portion A and also the third-layer metal layer 57 and the transparent conductive film 56 are etched sequentially in the peripheral circuit portion B. Thus, as shown in FIG. 16F, a pixel electrode 59a is formed in the display portion A and third-layer wiring patterns 59b are formed in the peripheral circuit portion B. The pixel electrode 59a is connected to the second-layer wiring pattern 10i and is electrically connected to the source region 8s of the TFT 8. Also, the third-layer wiring patterns 59b in the peripheral circuit portion B are connected to the second-layer wiring patterns 1a, 10f via the transparent conductive film 56 filled in the holes 13a, 13b.

Figure 16G:
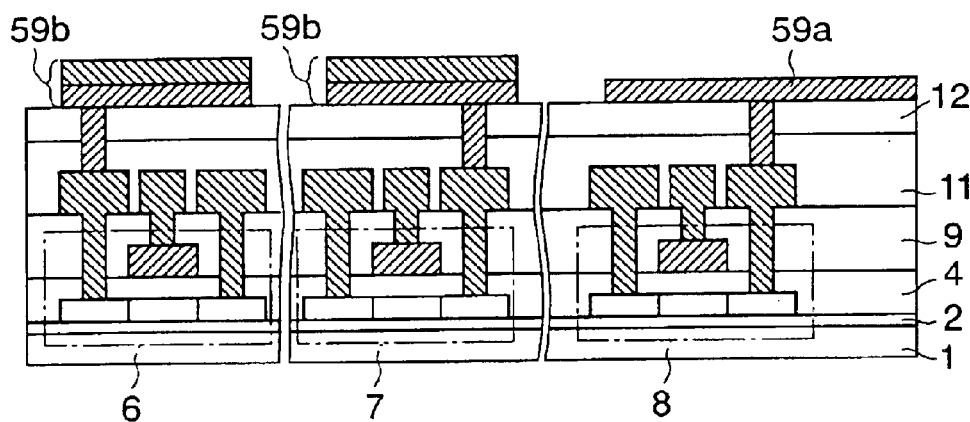
Figure 16H:
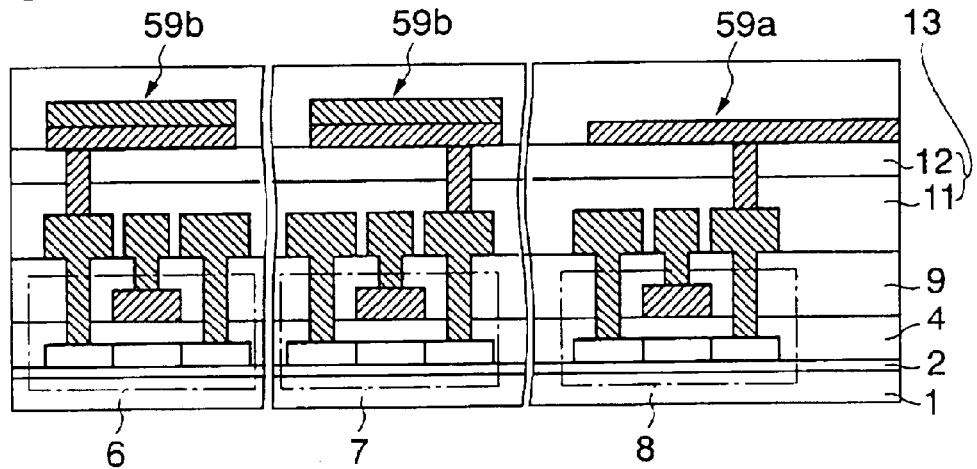

Then, as shown in FIG. 16G, the pixel resist pattern 58a and the wiring resist patterns 58b are removed by the oxygen ashing. Then, as shown in FIG. 16H, the alignment film 16 for covering the third-layer wiring patterns 59b and the pixel electrode 59a is formed on the second interlayer insulating film 13.

As described above, according to the fifth embodiment, the third-layer metal layer 57 is formed only in the peripheral circuit portion B by the mask selection sputter method while the transparent conductive film 56 is formed in the display portion A and the peripheral circuit portion B. Therefore, the pixel electrode 59a and the third-layer wiring patterns 59b can be formed by patterning the transparent conductive film 56 and the third-layer metal layer 57 via one photolithography step. As a result, the manufacturing steps can be simplified and the production cost can be reduced.

In FIG. 16A to FIG. 17, the same references as those in the first and second embodiments denote the same elements.

(Sixth Embodiment)

In a sixth embodiment, a method of constructing a high frequency signal transmission circuit from the first-layer to third-layer metal layers described in the first, second, fourth, and fifth embodiments will be explained hereunder, and also a structure in which the third-layer metal layer is employed as the electromagnetic shielding for the high frequency circuit will be explained hereunder.

Figure 18:
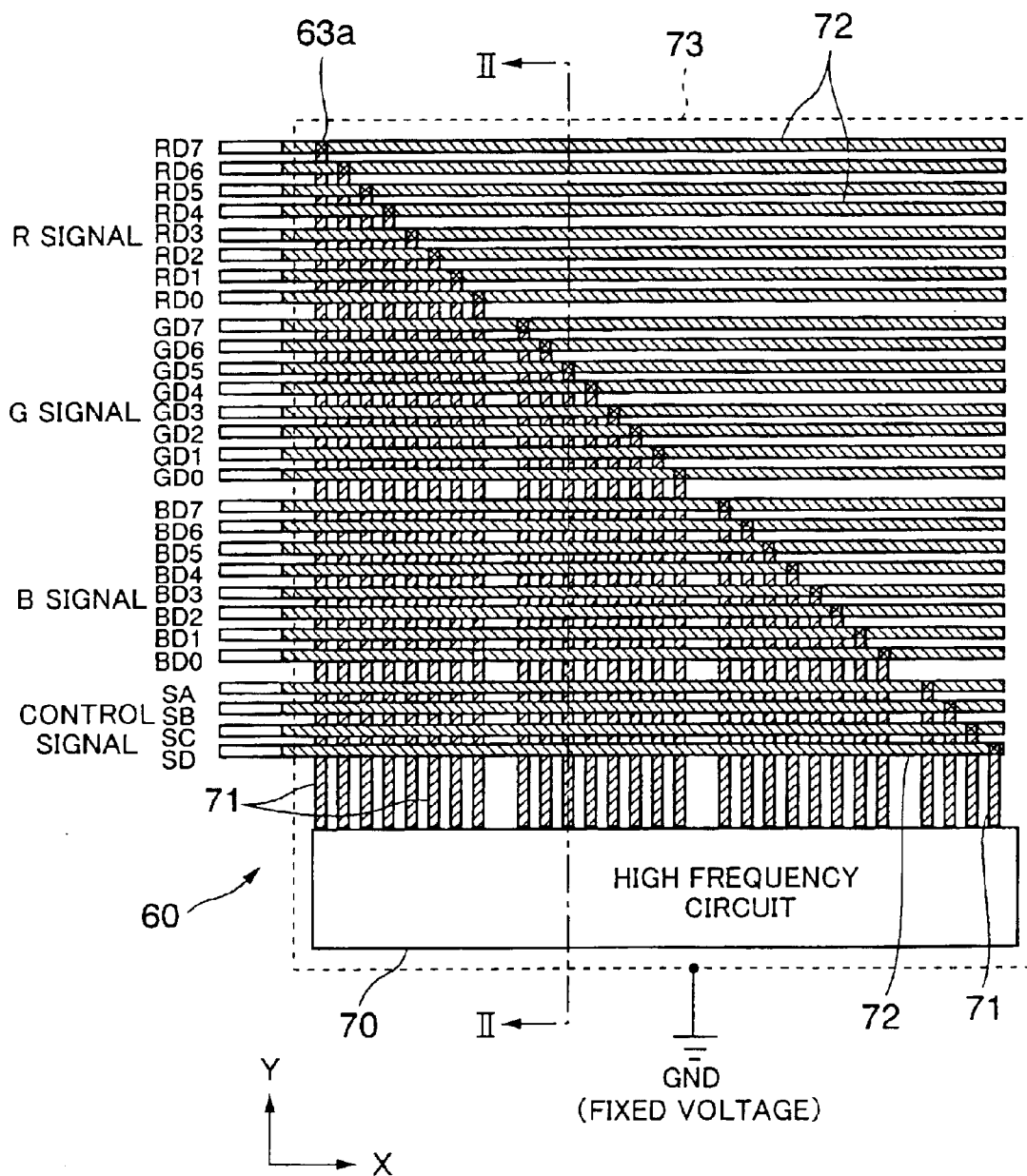
FIG. 18 is a plan view showing a high frequency signal transmission circuit of a liquid crystal display device according to a sixth embodiment of the present invention.
Figure 19:
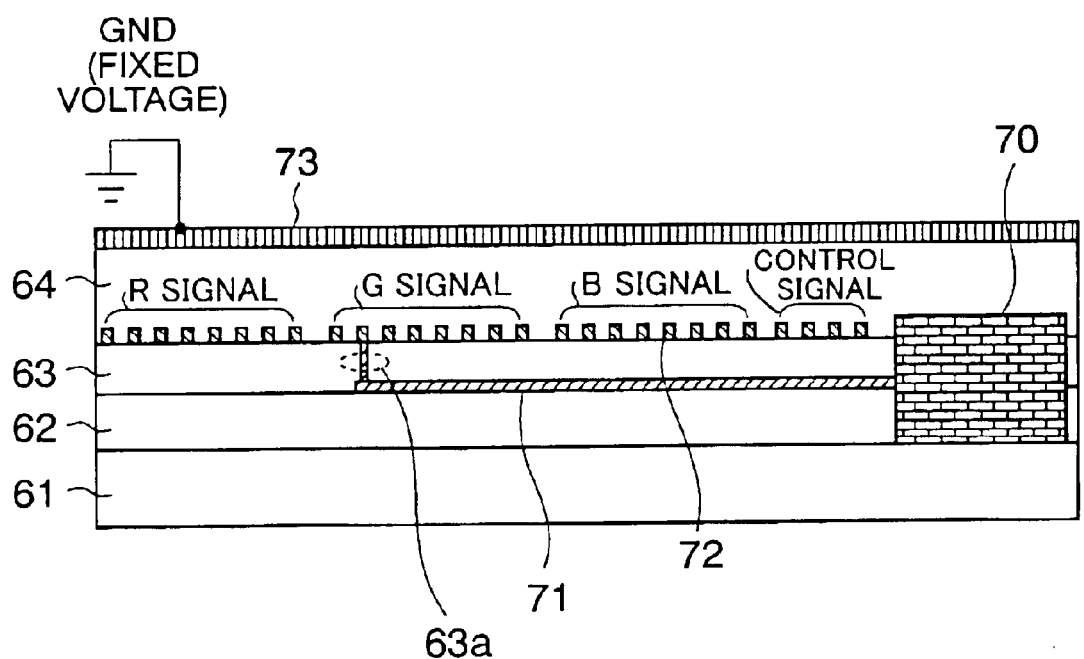
FIG. 19 is a sectional view showing the high frequency signal transmission circuit of the liquid crystal display device according to the sixth embodiment of the present invention.

FIG. 18 is a plan view showing a high frequency signal transmission circuit formed by patterning the first-layer to third-layer metal layers described in the first, second, fourth, and fifth embodiments, and FIG. 19 is a sectional view showing an electromagnetic shielding structure.

On the TFT substrate, three-color digital display signals (8-bit×3) of red (R), green (G), and blue (B), which are input into high frequency input terminals RD0 to RD7, GD0 to GD7, BD0 to BD7 of the high frequency signal transmission circuit 60, are input in the peripheral circuits via wirings in the high frequency signal transmission circuit 60. Also, on the TFT substrate, the high frequency control signals that are input into control signal terminals SA, SB, SC, SD of the high frequency signal transmission circuit 60 are input the peripheral circuits via wirings in the high frequency signal transmission circuit 60.

Although different according to the display formats, in the case of XGA (horizontal 1024×vertical 768), the master clock frequency is about 65 MHz in a single port and is about 33 MHz in a dual port. Since the electromagnetic radiation is generated in transmitting such high frequency signal to exert a bad influence upon the environment and the human body, the electromagnetic preventing measure is requested.

The high frequency signal input into the TFT substrate from the outside is transmitted to a high frequency circuit portion 70, etc. via the high frequency signal transmission circuit 60 shown in a plan view of FIG. 18. FIG. 19 is a sectional view taken along a II—II line in FIG. 18. In this case, FIG. 18 shows the arrangement of the wirings, etc.

As shown in FIG. 19, the high frequency signal transmission circuit 60 has a first-layer wiring 71 formed on an insulating film 62 formed on an insulating substrate 61, a second-layer wiring 72 formed on a first interlayer insulating film 63 for covering the first-layer wiring 71 and the insulating film 62, and a fixed-potential metal pattern 73 formed on a second interlayer insulating film 64 for covering the second-layer wiring 72 and the first interlayer insulating film 63. At least the upper portion of the second interlayer insulating film 64 is formed of a resin insulating film.

The first-layer wiring 71 is formed by patterning the first-layer metal layer constituting the gate electrodes 5b to 5d. Also, the second-layer wiring 72 is formed by patterning the second-layer metal layer constituting the second-layer wiring patterns 10a to 10i in the first embodiment, for example. In addition, the fixed potential metal pattern 73 is formed by patterning the third-layer metal layer constituting the third-layer wiring patterns 14a to 14c in the first embodiment, for example.

The first-layer wiring 71 is formed in parallel in plural at an interval in the vertical direction (Y direction) in FIG. 18. Also, the second-layer wiring 72 is formed in parallel in plural at an interval in the lateral direction (X direction) in FIG. 18.

One first-layer wiring 71 is connected to one second-layer wiring 72 via a contact hole 63a formed in the first interlayer insulating film 63.

The second-layer wiring 72 is connected to the high frequency input terminals RD0 to RD7, GD0 to GD7, BD0 to BD7 and the control signal terminals SA, SB, SC, SD. The first-layer wiring 71 is connected to the high frequency circuit portion 70 formed on the insulating substrate 61. This high frequency circuit portion 70 is constructed by the TFTS, the first-layer wiring patterns, the second-layer wiring patterns, etc. in the peripheral circuit portion B shown in the first embodiment.

The fixed-potential metal pattern 73 on the second interlayer insulating film 64 is patterned into a shape having a size to cover the first-layer wiring 71, the second-layer wiring 72, and the high frequency circuit portion 70. Also, the fixed-potential metal pattern 73 is connected electrically to a fixed potential such as the ground potential or the like, and thus shields them from the electromagnetic wave generated by the transmission of the high frequency signal.

Figure 20A:
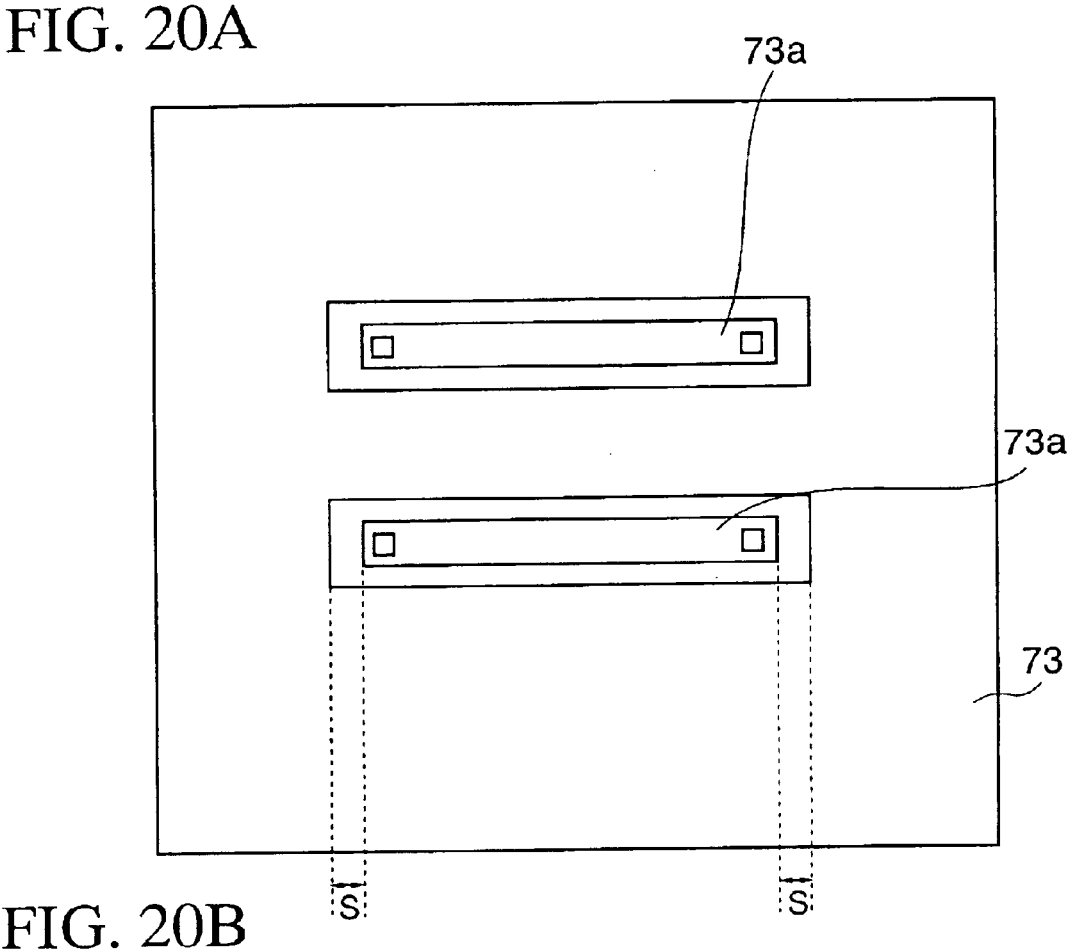
FIG. 20A is a plan view showing another high frequency signal transmission circuit of the liquid crystal display device according to the sixth embodiment of the present invention.
Figure 20B:
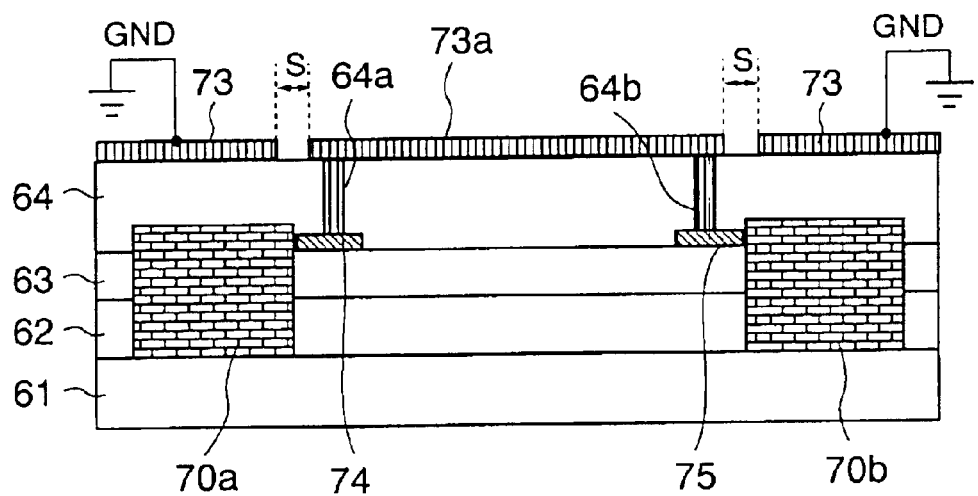
FIG. 20B is a sectional view showing the same.

FIG. 20A is a plan view showing a variation of the sixth embodiment, and FIG. 20B is a sectional view showing the same.

In FIGS. 20A and 20B, two high frequency circuits 70a, 70b in the peripheral circuit formed on the TFT substrate are a first terminal 74 and a second terminal 75 formed on the first interlayer insulating film 63 respectively. The first terminal 74 and the second terminal 75 are formed by patterning the second-layer metal layer as the origin of the second-layer wiring 72 respectively.

A plurality of bridge wirings 73a are formed by patterning the fixed-potential metal pattern 73 on the second interlayer insulating film 64. One end of the bridge wiring 73a is connected to the first terminal 74 via a hole 64a formed in the second interlayer insulating film 64, and the other end of the bridge wiring 73a is connected to the second terminal 75 via another hole 64b formed in the second interlayer insulating film 64. As a result, two high frequency circuits 70a, 70b are connected electrically via the first terminal 74, the second terminal 75, and the bridge wiring 73a.

Also, the fixed-potential metal pattern 73 that is patterned into a size that can cover the first-layer wiring 71, the second-layer wiring 72, and the high frequency circuits 70a, 70b is connected electrically to the fixed potential such as the ground potential GND or the like.

In this case, the third-layer metal layer 73 is formed by the same third-layer metal layer to expand around the bridge wirings 73a, but is isolated mutually via a clearance S of 3 to 50 μm.

In this case, a structure in which elements in the same high frequency circuit are connected by the wiring patterns, which are formed by patterning the third-layer metal layer, may be employed.

It is desired that the above third-layer metal layer should be formed of a metal layer containing aluminum to get the lower resistance value and the sheet resistance should be designed lower than 10 Ω/□. In the sixth embodiment, the metal layer having the double-layered structure consisting of titanium of 50 nm thickness and aluminum of 200 nm thickness is employed as the third-layer metal layer, and the sheet resistance of the metal layer having the double-layered structure is less than 0.2 Ω/□.

As described above, since the fixed-potential metal pattern 73 that is formed by patterning the third-layer metal layer on the second interlayer insulating film is connected to the ground potential, the radiation of the electromagnetic wave by the high frequency transmission wirings can be suppressed. As a result, the high frequency signal transmission circuit 60 can transmit the high frequency signal at a high S/N (signal/noise) ratio without fail. In addition, since the electromagnetic radiation from the TFT substrate can be reduced by the fixed-potential metal pattern 73, the electromagnetic radiation of the overall information system and therefore the above structure can contribute the construction of the environment-friendly information system. Further, since the high frequency transmission circuit having the above structure can prevent the electric oscillation of the high frequency circuit, the panel operation stability can be improved.

In the above embodiments, the interlayer insulating film may be expressed by the insulating film.

As described above, according to the liquid crystal display device of the present invention, the resin film is formed between the first metal pattern and the second metal pattern that are formed vertically. Therefore, the floating capacitance of the multi-layered wiring structure consisting of the first metal pattern and the second metal pattern can be reduced and thus the operation frequency of the peripheral circuit portion can be improved widely. In addition, since the floating capacitance should be seldom considered, the margin of circuit design can be enhanced.

Also, according to the present invention, the uppermost wiring and the pixel electrode are formed by the same insulating film. Therefore, the pixel-electrode connecting holes in the display portion can be formed simultaneously with the wiring connecting holes in the peripheral circuit portion, and thus the throughput can be improved.

In addition, the uppermost metal pattern of the multi-layered wiring structure in the peripheral circuit portion and the pixel electrodes in the display portion are covered with the same resin film, e.g., the alignment film. Therefore, the film thickness can be formed easily thick in contrast to the case where the inorganic insulating film is formed singly on the uppermost metal pattern, and thus the manufacturing process can be simplified.

According to the present invention, the transparent conductive film constituting the pixel electrodes is formed on the wirings in the peripheral circuit portion. Therefore, the wirings can be protected from the external environment before the resin film is formed on the wirings and the pixel electrodes.

According to the present invention, the fixed-potential metal pattern (electromagnetic shielding film) is formed of the uppermost metal layer and also the transmission circuit consisting of the multi-layered metal layer is formed thereunder. Therefore, the electromagnetic radiation generated when the high frequency signal is transmitted to the transmission circuit can be reduced.

According to the liquid crystal display device manufacturing method of the present invention, the transparent conductive film and the metal layer are formed in sequence on the insulating film in the display portion and the peripheral circuit portion, and then the thin pixel-electrode resist pattern is formed in the display portion at the same time when the thick wiring resist patterns are formed in the peripheral circuit portion. Therefore, after the wiring patterns and the pixel electrodes are formed by etching the metal layer and the transparent conductive film while using these resist patterns as a mask, the pixel-electrode resist pattern can be removed while thinning the wiring resist pattern by the oxygen plasma, etc., whereby the metal layer on the pixel electrodes can be selectively removed.

Also, according to the present invention, if the uppermost wiring and the pixel electrodes are formed together on the same insulating film in the peripheral circuit portion and the display portion, the metal layer is formed on areas except the display region by using the sputter mask and also the transparent conductive film is formed on the insulating film in the display region and on or under the metal layer in peripheral circuit portion by the sputter method. Therefore, according to one photolithography step, the pixel electrode consisting of the transparent conductive film can be formed in the display portion and also the wirings having the double-layered structure consisting of the transparent conductive film and the metal layer can be formed in the peripheral circuit portion.

What is claimed is:

1. A liquid crystal display device comprising:

a first substrate on which a display portion, that has a pixel matrix, scanning bus lines and data bus lines, and a peripheral circuit portion, that has gate drivers for driving the scanning bus lines and data drivers for driving the data bus lines, are formed;

a second substrate opposed to the first substrate; and liquid crystals put between the first substrate and the second substrate;

wherein at least a part of the peripheral circuit portion has first metal patterns formed on the first substrate, a first insulating film formed on the first metal patterns, a second metal pattern formed on the first insulating film, a second insulating film formed on and in contact with the second metal pattern to have at least a first resin film, and third metal patterns formed on the second insulating film and electrically connected to the second metal pattern via a hole formed in the second insulating film, and the display portion having an active element formed on the first substrate and covered with the second insulating film, and a pixel electrode formed in a pixel region on the second insulating film and connected electrically to the active element via a hole that is formed in the second insulating film.

2. A liquid crystal display device according to claim 1, further comprising a second resin film formed on the third metal pattern, and wherein the pixel electrodes are formed between the second insulating film and the second resin film.

3. A liquid crystal display device according to claim 2, wherein the second resin film is an alignment film formed in the display portion or a resin film having a quality of material same as the alignment film.

4. A liquid crystal display device according to claim 2, wherein an insulating seal is formed on the third metal pattern in the peripheral circuit portion.

5. A liquid crystal display device according to claim 1, wherein leading metal patterns that consist of a same material as the third metal pattern and are connected electrically to the active elements are formed on the second insulating film in the display portion, and the pixel electrodes are formed of a transparent conductive film that is formed on the leading metal patterns.

6. A liquid crystal display device according to claim 5, wherein the leading metal patterns are constructed by a multi-layered or single-layer metal film having a material same as or a quality of the material substantially similar to the third metal pattern in the peripheral circuit portion.

7. A liquid crystal display device according to claim 1, wherein a transparent conductive film is formed on the third metal pattern in the peripheral circuit portion.

8. A liquid crystal display device according to claim 1, wherein the pixel electrode is formed of a metal pattern formed on the second insulating film to have a reflection surface.

9. A liquid crystal display device according to claim 8, wherein the metal pattern constituting the pixel electrode is constructed by a multi-layered or single-layer metal film having a material same as or a quality of the material substantially similar to the third metal pattern in the peripheral circuit portion.

10. A liquid crystal display device according to claim 1, wherein the pixel electrode in the display portion is formed of a transparent conductive film pattern, and the transparent conductive film pattern is formed over the first metal pattern and the second metal pattern in the peripheral circuit portion.

11. A liquid crystal display device according to claim 1, wherein at least a part of the peripheral circuit portion has thin film transistors formed on the substrate, and the first metal patterns are a gate electrode and electric wirings of the thin film transistors, and the second metal pattern is source/drain electrodes and the electric wirings of the thin film transistors.

12. A liquid crystal display device according to claim 1, wherein the data driver is a digital driver that has a register circuit, a latch circuit, a D/A converter circuit, and an analog buffer circuit and employs the first metal pattern, the second metal pattern, and the third metal pattern.

13. A liquid crystal display device manufacturing method comprising the steps of:

forming a first wiring over a substrate;

forming a first insulating film on the first wiring;

forming a second wiring on the first insulating film;

forming a second insulating film containing at least a first resin film on the second wiring and the first insulating film;

forming a hole in the second insulating film on the second wiring;

forming a third wiring, which is electrically connected to the second wiring, on the second insulating film and in the hole in a peripheral circuit portion; and forming pixel electrodes on the second insulating film in a display portion.

14. A liquid crystal display device manufacturing method according to claim 13, further comprising the step of:

forming a second resin film on the third wiring formed in the peripheral circuit portion and the pixel electrodes in the display portion.

15. A liquid crystal display device comprising:

a circuit having first metal patterns formed on a substrate, a second metal pattern formed on the first metal patterns via a first insulating film, holes formed in the first insulating film to connect the first metal pattern and the second metal pattern, a second insulating film formed on the second metal pattern, and third metal patterns formed on the second insulating film and set to a fixed potential.

16. A liquid crystal display device according to claim 15, wherein the circuit is a high frequency signal transmission circuit portion or a peripheral circuit portion.

17. A liquid crystal display device according to claim 15, wherein the third metal patterns are an electromagnetic radiation suppressing film.

18. A liquid crystal display device according to claim 15, wherein a wiring pattern for an electronic circuit function operation, which is formed of a metal layer having a same structure as the third metal patterns, is formed on the second insulating film.

* * * * *